US011920862B2

(12) United States Patent
Sever et al.

(10) Patent No.: US 11,920,862 B2
(45) Date of Patent: Mar. 5, 2024

(54) METHODS AND APPARATUSES FOR USING DRY ICE CONTAINERS

(71) Applicants: Robert R. Sever, Northbrook, IL (US); Ying Zhou, Naperville, IL (US); Ranko Bursac, Libertyville, IL (US)

(72) Inventors: Robert R. Sever, Northbrook, IL (US); Ying Zhou, Naperville, IL (US); Ranko Bursac, Libertyville, IL (US)

(73) Assignee: Praxair Technology, Inc., Danbury, CT (US)

( * ) Notice: Subject to any disclaimer, the term of this patent is extended or adjusted under 35 U.S.C. 154(b) by 490 days.

(21) Appl. No.: 16/720,910

(22) Filed: Dec. 19, 2019

(65) Prior Publication Data

US 2021/0190405 A1    Jun. 24, 2021

(51) Int. Cl.
*F25D 3/12* (2006.01)
*A01N 1/02* (2006.01)
*F25D 23/02* (2006.01)

(52) U.S. Cl.
CPC ............ *F25D 3/125* (2013.01); *F25D 23/028* (2013.01); *A01N 1/0273* (2013.01); *F25D 2201/10* (2013.01); *F25D 2303/083* (2013.01); *F25D 2303/0843* (2013.01)

(58) Field of Classification Search
CPC ......... A01N 1/0257; F25D 3/12; F25D 3/125; F25D 3/14; F17C 6/00
See application file for complete search history.

(56) References Cited

U.S. PATENT DOCUMENTS

| 1,825,644 A | | 9/1931 | Martin, Jr. |
| 1,843,055 A | * | 1/1932 | Weinstein ................ F25D 3/14 |
| | | | 62/331 |
| 1,999,670 A | | 4/1935 | Strouse et al. |

(Continued)

FOREIGN PATENT DOCUMENTS

| CH | 253685 A | 3/1948 |
| CN | 209027165 U | 6/2019 |

(Continued)

OTHER PUBLICATIONS

Liu et al, size measurement of dry ice particles produced from liquid carbon dioxide, Jan. 25, 2012, Journal of Aerosol Science (Year: 2012).*

*Primary Examiner* — Christopher R Zerphey

(57) ABSTRACT

Methods and apparatuses for loading, removing, accessing, positioning or preserving one or more items in a presence of dry ice are provided. The apparatus includes a tapered container that has a barrier-like structure which can partition the inner volume of the tapered container into an internal product storage volume and a dry icechamber. Each of the regions remain substantially undisturbed during handling, operation, use and transport of the tapered container. Methods for selectively introducing dry ice into the dry ice chamber of the tapered container and engaging the barrier-like structure within the tapered container can be achieved with a novel guiding assembly apparatus. The methods and apparatuses are particularly useful when loading and retrieving one or more items in the presence of dry ice for tapered containers that have single restrictive access openings and/or other characteristics which make access and handling difficult.

11 Claims, 11 Drawing Sheets

(56) References Cited

U.S. PATENT DOCUMENTS

| | | | | |
|---|---|---|---|---|
| 3,108,840 | A * | 10/1963 | Conrad | F17C 3/02 |
| | | | | 220/592.27 |
| 4,281,520 | A * | 8/1981 | Norwood | F25D 3/08 |
| | | | | 62/372 |
| 4,630,596 | A * | 12/1986 | Hales | F25D 3/08 |
| | | | | 607/114 |
| 4,723,974 | A * | 2/1988 | Ammerman | A01N 1/0273 |
| | | | | 62/530 |
| 4,916,922 | A * | 4/1990 | Mullens | G01N 1/42 |
| | | | | 62/372 |
| 4,951,482 | A * | 8/1990 | Gilbert | F25D 3/08 |
| | | | | 62/306 |
| 5,937,895 | A | 8/1999 | Le Febre et al. | |
| 10,712,072 | B2 * | 7/2020 | Zhou | A01N 1/0257 |
| 11,193,708 | B2 * | 12/2021 | Sever | C01B 32/55 |
| 11,248,838 | B2 * | 2/2022 | Zhou | F25J 1/0027 |
| 11,352,262 | B2 * | 6/2022 | Zhou | F25J 1/0027 |
| 2014/0208778 | A1 * | 7/2014 | Raley | F25D 3/08 |
| | | | | 383/14 |
| 2018/0010839 | A1 * | 1/2018 | Zhou | F25D 3/14 |
| 2018/0299193 | A1 | 10/2018 | Burkot et al. | |

FOREIGN PATENT DOCUMENTS

| | | |
|---|---|---|
| JP | S6322581 U | 2/1988 |
| JP | S6322583 U | 2/1988 |
| JP | 200850669 A | 3/2008 |
| JP | 5850464 B2 | 2/2016 |
| WO | 2015/082704 A1 | 6/2015 |

\* cited by examiner

FIG. 9a  FIG. 9b  FIG. 9d

METHODS AND APPARATUSES FOR USING DRY ICE CONTAINERS

FIELD OF INVENTION

This invention relates to methods and apparatuses for loading, removing, accessing, positioning or preserving one or more items that can be stored or transported in a presence of dry ice. Particularly, the invention relates to apparatuses with an internal product volume that is separate and distinct from a dry ice chamber and methods for accessing and forming the internal product volume and the dry ice chamber.

BACKGROUND OF THE INVENTION

A common means of preserving or stabilizing biological materials is to maintain them in a frozen state. Such biological materials could include tissue or fluid specimens taken from humans or animals for research or diagnostic purposes. Such biological materials additionally could include pharmaceutical or medical device products comprised at least partly of cells or cellular components.

The biological material is often frozen or kept frozen by placing it in proximity to solid carbon dioxide (i.e., dry ice), which is approximately −78.5° C. at atmospheric pressure. An insulated container holding the biological material and dry ice may be used to store the biological material at a single location or to convey the biological material from one location to another.

Unfortunately, today's commercially available containers tend to allow unacceptable amounts of heat to enter into the interior volume. As a result, dry ice within the container can be susceptible to the transfer of heat from the surrounding environment during storage, handling and transport, which can cause a significant portion of the dry ice to sublimate too quickly, thereby reducing cooling duration. Furthermore, as the dry ice sublimates, significant temperature gradients can arise within the interior sample space, potentially compromising the quality of the biological material.

To overcome the shorter cooling duration, more dry ice can be introduced into the commercially available containers. However, more dry ice can lead to increased handling and transport problems. For example, increasing the dry ice quantity increases the container weight, potentially leading to ergonomic difficulties and greater transportation expenses. Furthermore, during transport, the biological materials inside the container can float and shift to the extent that they can mix with dry ice or even become embedded within the dry ice such that removal of the items from the container at the destination site is difficult or not possible. Additionally, the items can become damaged as a result of the dry ice pressing with substantial force against the items.

In view of these drawbacks, there is an unmet need for improved methods and apparatuses for loading, removing, accessing, positioning or preserving with improved cooling duration one or more items that can be stored or transported in the presence of dry ice.

SUMMARY OF THE INVENTION

In one aspect, an apparatus with a single restrictive access opening for loading, positioning, removing, or accessing one or more items that can be stored, preserved or transported in a presence of dry ice, comprising: a tapered container with an interior volume defined by an interior body section and an interior neck section, the interior body section comprising at least a first region, wherein the first region is a dry ice chamber, said dry ice chamber adapted to receive substantially all of the dry ice that is selectively directed into the interior volume of the tapered container through the single restrictive access opening located at the interior neck section; the interior volume of the tapered container further including a second region that is non-overlapping with the first region of the tapered container, wherein the second region is an internal product storage volume contained within a barrier-like structure, the internal product storage volume characterized by a substantial absence of the dry ice, the internal product storage volume configured to be accessed through the single restrictive access opening to remove or load the one or more items; the barrier-like structure having a first portion and a second portion with the internal product storage volume extending between the first portion and the second portion, said first portion of the barrier-like structure oriented within or towards the single restrictive access opening located at the interior neck section, said barrier-like structure having an opening into the internal product storage volume along the first portion, wherein said barrier-like structure partitions the interior volume of the tapered container into the first region and the second region, the barrier-like structure situated solely in the interior neck section, solely in the interior body section or within portions of the interior neck section and the interior body section.

In a second aspect, a method of preparing an apparatus configured for loading, positioning, removing, accessing or preserving one or more items that can be stored or transported in a presence of dry ice, comprising: providing a tapered container with an interior volume defined by an interior body section and an interior neck section, the interior body section extending between a first end and a second end, the interior neck section having a single restrictive access opening extending into the interior volume of the tapered container; inserting a barrier-like structure through the single restrictive access opening of the interior neck section, said barrier-like structure having a first portion and a second portion and an opening along the first portion, the opening adapted for loading the one or more items therein; partitioning the interior volume of the tapered container to create a dry ice chamber and an internal product storage volume located within the barrier-like structure, said dry ice chamber external to and surrounding the internal product storage volume; blocking the opening of the barrier-like structure; and selectively filling the dry ice chamber with the dry ice through the single restrictive access opening; and accumulating the dry ice to a predetermined level within the dry ice chamber without substantial introduction or migration of the dry ice into the internal product storage volume of the barrier-like structure.

In a third aspect, a method of preparing an apparatus configured for loading, positioning, removing, accessing or preserving one or more items that can be transported in a presence of dry ice, comprising: providing a tapered container with an interior volume defined by a dry ice chamber occupying at least an interior body section of the tapered container, the interior volume further including an interior neck section with a single restrictive access opening, the interior body section extending between a first end and a second end, the single restrictive access opening extending into the dry ice chamber of the tapered container; partially filling the dry ice chamber with the dry ice through the single restrictive access opening; accumulating the dry ice to a predetermined level within the dry ice chamber to create a partially filled dry ice chamber, wherein the partially filled chamber has sufficient clearance for the partially filled dry ice chamber to accommodate a barrier-like receptacle; and inserting the barrier-like receptacle through the single restrictive access opening in the dry ice chamber.

In a fourth aspect, A method of filling dry ice into an apparatus configured for loading, removing, accessing, positioning or preserving one or more items that can be stored or transported in a presence of dry ice, comprising: providing a tapered container comprising an interior body section and an interior neck section, the interior body section extending between a first end and a second end, the interior body section at least partially defining an interior volume of the tapered container, the interior neck section having a single restrictive access opening extending into the interior volume of the tapered container; inserting a barrier-like structure through the single restrictive access opening of the interior neck section; partitioning the interior volume of the tapered container into a dry ice chamber and an interior product storage volume, wherein interior product storage volume is located within or affixed to an interior of the barrier-like structure, the interior product storage volume adapted to be accessed for a removal or introduction of the one or more items therein without discarding dry ice from the dry ice chamber, said dry ice chamber located external to the barrier-like structure, the dry ice chamber adapted to receive the dry ice occupying at least a portion of the second end; placing a guiding assembly into the single restrictive access opening to operably connect to a portion of the barrier-like structure that is oriented towards the single restrictive access opening so as to create a pathway for dry ice to be guided into the dry ice chamber and not the internal product storage volume; introducing the dry ice into the guiding assembly apparatus; and directing the dry ice into the dry ice chamber but not the interior product storage volume.

In a fifth aspect, a method of loading and positioning one or more items into an apparatus configured for preserving one or more items in a presence of dry ice, comprising the steps of: providing a tapered container comprising an interior body section and an interior neck section, the interior body section extending between a first end and a second end, the interior body section at least partially defining an interior volume of the tapered container, the interior neck section having a single restrictive access opening extending into the interior volume of the tapered container; inserting a barrier-like structure through the single restrictive access opening of the interior neck section; partitioning the interior volume of the tapered container into a dry ice chamber and an internal product storage volume, wherein the internal product storage volume is located within or affixed to an interior of the barrier-like structure, the internal product storage volume adapted to be loaded with the one or more items, said dry ice chamber located external to the barrier-like structure, the dry ice chamber adapted to receive the dry ice occupying at least a portion of the second end; securing the barrier-like structure to the tapered container along the interior neck section or the interior body section; and loading the one or more items into the internal product storage volume without disruption of the dry ice chamber.

In a sixth aspect, a guiding assembly apparatus for selectively introducing dry ice into a dry ice chamber of a tapered container without disruption of an internal product storage volume of the tapered container, comprising: a removable cap structure; a funnel-like structure; an extended ring; and an elongated portion having a first end integrally or operably connected to the funnel-like structure, and a second end integrally or operably connected to the removable cap structure; wherein said funnel-like structure comprises tapered walls adapted to capture and receive dry ice therethrough without substantial spillage of said dry ice from the funnel-like structure; and wherein said removable cap structure is configured to engage with a barrier-like structure so as to prevent dry ice from entering into an interior of the barrier-like structure, and further wherein an outer surface of the removable cap structure is flared outwardly so as to provide a selected pathway of dry ice into a dry region external to the barrier-like structure.

In a seventh aspect, a method of removing one or more items from an apparatus configured for storing, preserving or transporting one or more items in a presence of dry ice, comprising the steps of: receiving an apparatus comprising: a tapered container and barrier-like structure; the tapered container comprising an interior body section and an interior neck section, the interior body section extending between a first end and a second end, the interior body section at least partially defining an interior volume of the tapered container, the interior neck section having a single restrictive access opening extending into the interior volume of the tapered container, the barrier-like structure disposed at least partially within the interior volume of the tapered container, said barrier-like structure partitioning the interior volume of the tapered container into a dry ice chamber and an internal product storage volume; said internal product storage volume located within or affixed to an interior of the barrier-like structure, the internal product storage volume containing the one or more items; and said dry ice chamber located external to the barrier-like structure, the dry ice chamber filled with at least a portion of the dry ice; opening the tapered container; directing a removal tool through the single restrictive access opening; grasping the barrier-like structure using the removal tool; withdrawing the removal tool with the barrier-like structure attached thereto without discarding the dry ice contained in the dry ice chamber, wherein the one or more items are contained in the internal product storage volume that is located inside of the barrier-like structure.

In an eighth aspect, a method of removing one or more items from an apparatus configured for storing, preserving or transporting one or more items in a presence of dry ice, comprising the steps of: receiving an apparatus at a first destination site, said apparatus comprising: a tapered container and barrier-like structure; the tapered container comprising an interior body section and an interior neck section, the interior body section extending between a first end and a second end, the interior body section at least partially defining an interior volume of the tapered container, the interior body section transitioning into the interior neck section, the interior neck section having a single restrictive access opening extending into the interior volume of the tapered container, the barrier-like structure disposed at least partially within the interior volume of the tapered container, said barrier-like structure partitioning the interior volume of the tapered container into a dry ice chamber and an internal product storage volume; said internal product storage volume located within or affixed to an interior of the barrier-like structure, the internal product storage volume containing the one or more items; and said dry ice chamber located external to the barrier-like structure, the dry ice chamber filled with at least a portion of the dry ice; accessing the tapered container from the interior neck section; directing a removal tool through the single restrictive access opening; grasping the one or more items located within the internal product storage volume of the barrier-like structure using the removal tool; withdrawing the removal tool with the one or more items attached to the removal tool without removal of the barrier-like structure and without discarding the dry ice contained in the dry ice chamber.

In a ninth aspect, an apparatus with a single restrictive access opening for loading, positioning, removing, or accessing one or more items that can be stored, preserved or transported in a presence of dry ice, comprising: a tapered container with an interior volume defined by an interior body section and an interior neck section, the interior body section comprising at least a first region, wherein the first region is a dry ice chamber, said dry ice chamber adapted to receive substantially all of the dry ice that is selectively directed into the interior volume of the tapered container through the single restrictive access opening located at the interior neck section; the interior volume of the tapered container further including a second region that is non-overlapping with the first region of the tapered container, wherein the second region is an internal product storage volume contained within a barrier-like structure, the internal product storage volume characterized by a substantial absence of the dry ice, the internal product storage volume configured to be accessed through the single restrictive access opening to remove or load the one or more items; wherein said barrier-like structure partitions the interior volume of the tapered container into the first region and the second region, the barrier-like structure situated solely in the interior neck section, solely in the interior body section or within portions of the interior neck section and the interior body section; further wherein the barrier-like structure is characterized as a barrier-like receptacle, said barrier-like receptacle having an access opening for accessing an interior region to receive the one or more items, said barrier-like receptacle comprising a retrieval member attached thereto, said retrieval member comprising an exposed retrieval member portion that extends out from or within the interior volume of the tapered container, said exposed retrieval member portion configured to be grasped to access the receptacle.

BRIEF DESCRIPTION OF THE DRAWINGS

FIG. 4c illustrates a perspective view of the barrier-like structure of FIG. 4a possessing a mounting ring located externally along a bottom portion of the barrier-like structure;

FIG. 4d illustrates a perspective view of the guiding assembly of FIG. 4a;

FIG. 6a illustrates a cross-sectional view of the guiding assembly of FIGS. 4a and 4d engaged and connected to a top edge of the barrier like-structure of FIGS. 4a and 4c to form a dry ice filling apparatus for filling dry ice into the dry ice chamber of the tapered container of FIG. 4a;

FIG. 7a illustrates an insulated cap, flexible bag with tether and tapered container disassembled from each other, with the spatial relation of each of the components relative to each other and prior to their assembly as shown by the spatial arrows between the insulated cap and the flexible bag, and between the flexible bag and the tapered container to form an apparatus;

FIG. 7b illustrates a perspective view of the flexible bag with tether of FIG. 7a;

FIG. 7c illustrates a perspective view of the insulated cap of FIG. 7a;

FIG. 9a illustrates an insulated cap with grooves, sample holder with arms and tapered container disassembled from each other, with the spatial relation of each of the components relative to each other and prior to their assembly as shown by the spatial arrows between the insulated cap with grooves and the sample holder and between the sample holder and the tapered container to form an apparatus;

FIG. 9b illustrates a perspective view of the insulated cap with grooves of FIG. 9a;

FIG. 9d illustrates a perspective view of the sample holder of FIG. 9c connected into the grooves of the insulated cap of FIG. 9b.

DETAILED DESCRIPTION OF THE INVENTION

Figure 1:
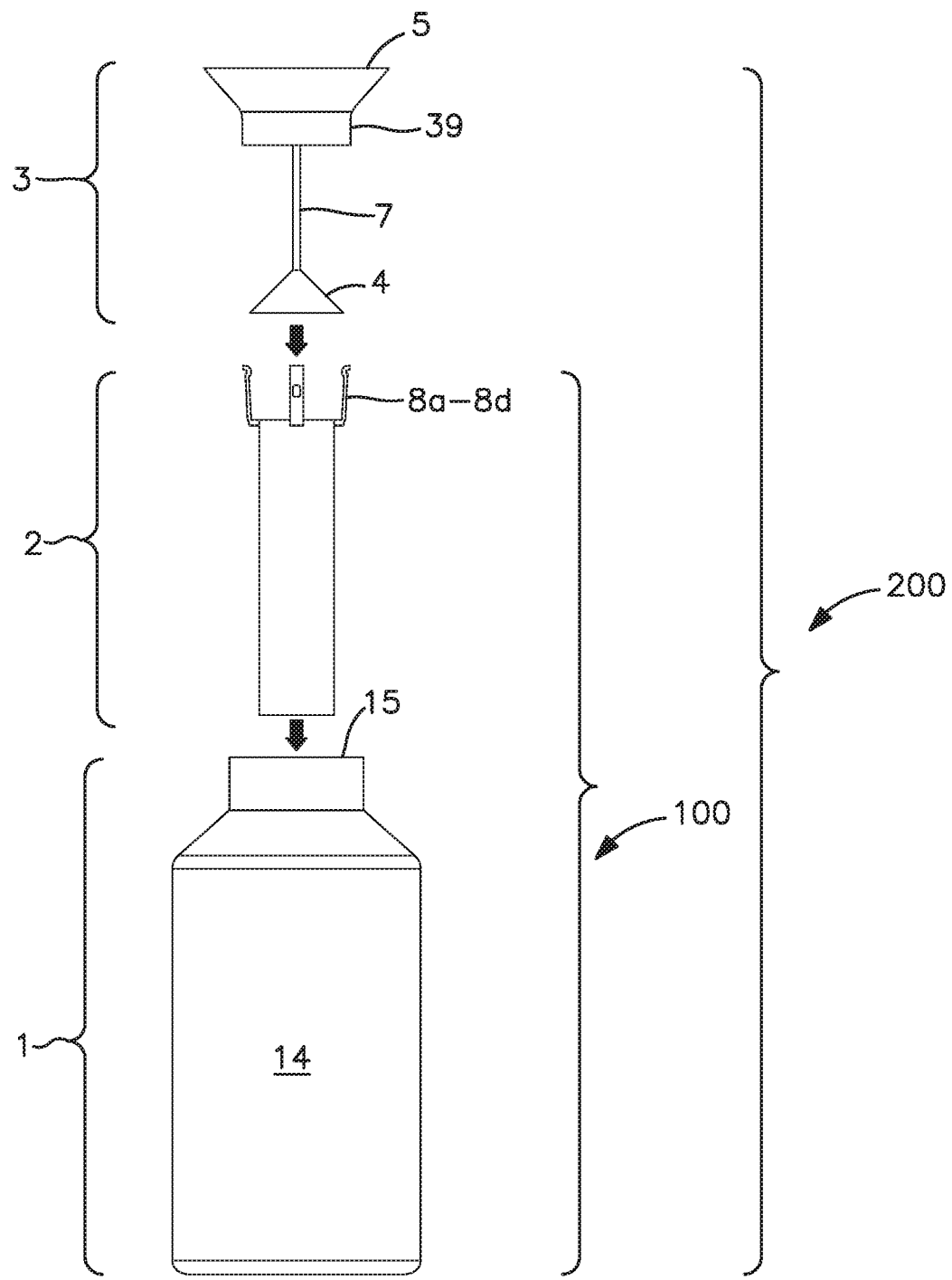
FIG. 1 illustrates a guiding assembly, a barrier-like structure and a tapered container disassembled from each other, with the spatial relation of each of the components relative to each other and prior to their assembly as shown by the spatial arrows located between the guiding assembly and the barrier-like structure and between the barrier-like structure and the tapered container to form an apparatus.

It should be understood that the term "CO2 snow" and "dry ice" have the same meaning and may be used interchangeably herein and throughout to mean particles (i.e., nuggets, pellets and the like) or blocks of solidified carbon dioxide.

"Connected" or "operably connected" as used herein and throughout means a direct or indirect engagement between two or more components, so as to enable mechanical, chemical, magnetic, electrical or any other known attachment means between the two or more components. Any suitable connection is contemplated, including friction or press fit, adhesion, welding, mechanical fasteners and any other mechanical as well as chemical, magnetic, electrical or other known attachments means for securing two or more components, in which the attachment is permanent or temporary.

"Item" as used herein and throughout means any temperature-sensitive goods, samples, products or supplies which may be susceptible to spoilage, degradation, and/or structural alteration or modification if not maintained frozen or below a certain temperature, including, but not limited to, biological samples, such as blood, urine and tissue samples or their constituents; perishable foods, such as meat, poultry, fish and dairy products; personal care items; and chemicals.

"Internal product volume" or "payload region" or "payload area" or "sample region" or "product storage volume," any of which may be used interchangeably herein and throughout, means the space within the tapered container where items are stored and that is separate and distinct from the dry ice chamber.

"Dry ice chamber" or "CO2 chamber, or "CO2 snow chamber", or "dry ice region," or "CO2 region" any of which may be used interchangeably herein and throughout, means the space within the tapered container where dry ice is stored and that is separate and distinct from the internal product volume.

"Charging" or "filling" or "introducing" or "loading" or "feeding", any of which may be used interchangeably herein and throughout, means the process of feeding dry ice into a tapered container or apparatus, whereby the dry ice can be manually or automatically introduced into the tapered container or apparatus.

"Container" as used herein and throughout means any storage, filling, delivery or transportable vessel capable of receiving dry ice, including but not limited to, cylinders, canisters, dewars, bottles, boxes, shipping containers, tanks, barrels, bulk vessels, and microbulk vessels.

"Transportable" as used herein and throughout means an apparatus that is capable of being moved, transported or shipped from a user location to another destination by any known means, including, but not limited to, air, ground or water. The transport or shipping can occur through various packaged delivery services, including, but not limited to, parcel post, UPS® shipping services, FedEx® shipping services and the like.

The relationship and functioning of the various elements of the embodiments are better understood by the following detailed description. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

"Tapered container" or "tapered geometry" as used herein and throughout is intended to mean a transition from an interior neck section of a container to an interior body section of the container or vice versa, wherein a cross-sectional area parallel to the restrictive access opening is smaller for the interior neck section compared to a cross-sectional area parallel to the restrictive access opening of the interior body section and whereby the transition can occur continuously, discretely in one or more regular or irregular increments or as a sudden step-change. The restrictive access opening as used herein and throughout represents the sole access point through which dry ice and items are loaded into the tapered container and may be referenced herein and throughout as a "single restrictive access opening."

"Interior neck section," as used herein and throughout, is intended to mean an internal section of a tapered container that includes a single restrictive access opening, which constitutes the sole access into the interior neck section followed by the interior body section of the tapered container, and whereby the "interior neck section" has a smaller cross-sectional area parallel to the single restrictive access opening than a cross-sectional area parallel to the single restrictive access opening of the interior body section.

"Interior body section" as used herein and throughout is intended to mean that portion of an internal volume of a tapered container that is adapted to receive substantially all of the dry ice and items that are loaded into the interior volume of the tapered container through a single restrictive access opening located at an interior neck section, and whereby the "interior body section" has a larger cross-sectional area parallel to the single restrictive access opening than a cross-sectional area parallel to the single restrictive access opening of the interior neck section.

In the following description, terms such as horizontal, upright, vertical, above, below, beneath and the like, are to be used solely for the purpose of illustrating the present invention and should not be taken as words of limitation. For example, the terms horizontal and vertical as used herein and throughout are referenced with a tapered container 1 that is oriented in its upright position, for example, as shown in FIGS. 1-10, when describing its features.

The drawings are for the purpose of illustrating the invention and are not intended to be drawn to scale. The embodiments are described with reference to the drawings in which similar elements are referred to by like numerals. Certain features are intentionally omitted in each of the drawings to better illustrate various aspects of the tapered containers, apparatuses, fabrication and filling processes in accordance with the principles of the present invention. The embodiments as described below are by way of example only, and the invention is not limited to the embodiments illustrated in the drawings.

The present invention recognizes that certain geometries and structures of containers are better suited than others to establish extended cooling duration of items during storage and transport. For example, the inventors have evaluated the effectiveness of a cylindrical shaped container. The items and dry ice are loaded into the interior of the cylindrical shaped container. The container insulation presents a resistance to heat flow from the ambient environment into the container interior. To provide users the ability to access the interior of the container to load or remove items or dry ice, the container insulation must be removable at an opening of the container. It has been determined that the removable section of container insulation at the opening typically provides inferior insulation performance compared to the remaining container insulation. The size of the opening therefore directly affects cooling duration performance of the container. The loading of items and dry ice into the body section of a cylindrical shaped container is made easier when the access area at the opening is larger. However, the inventors observed that a larger opening at the neck section often resulted in insufficient cooling duration of the container as a result of the tendency for excess heat ingress to occur through the removable insulation at that opening. In situations where the cooling duration was unacceptable, it was determined that an opening approximately the same size as the body section was not a satisfactory design. Although a larger opening may be able to produce acceptable cooling duration by introducing more dry ice into the container, greater amounts of dry ice results in a heavier container that can be less conducive for transport, handling and usage.

Instead, the inventors realized the need to shift to a tapered geometry in which the container has a relatively narrow interior neck section and neck opening in comparison to the interior body section of the container for purposes of being able to significantly reduce heat ingress into a container with dry ice and items therein.

Still further, the number of access openings along the container preferably is minimized to reduce possible heat conductive pathways which have the potential of increasing heat ingress into the container. Each and every access opening will require a corresponding removable section of container insulation which has been determined to degrade the overall performance of the container insulation.

Accordingly, given such design issues, in addition to a narrower interior neck section and neck opening, it was determined that separate ports for introducing dry ice and items into the container cannot provide satisfactory performance in terms of cooling duration. Instead, the tapered containers of the present invention have a single restrictive access opening through which dry ice and items are loaded. A tapered geometry with a narrowed interior neck section and a single restrictive access opening at the neck section and a relatively wider interior body section has been identified as critical to assist in minimizing heat ingress into the container and thereby improve cooling duration in comparison to many other commercially available containers. Further, the present invention achieves such improved cooling duration in an efficient manner, whereby the amount of dry ice introduced into the container is minimized, thereby allowing for potential usage of a relatively small sized, lightweight container if desired.

Nonetheless, prior to the emergence of the present invention, such tapered containers have proven difficult to handle and use. Filling dry ice into a tapered container with narrowed interior neck section and with a single restrictive access opening is challenging. For instance, a user cannot readily use a scooper or other functionally equivalent device for loading dry ice into such a tapered container with a single restrictive access opening. Substantial spillage of dry ice can occur, which can pose a safety risk if the user is exposed to the dry ice.

Even if dry ice and items can fit through the single restrictive access opening, the items often have to be forced into the dry ice, which can damage the structural integrity of certain items (e.g., biological samples).

Furthermore, the dry ice and the items can shift positions within the confined volume, and therefore the items tend to become embedded within the dry ice. Removal of embedded items becomes difficult and often requires discarding the dry ice from the container in order to gain access to the items. In some instances, the items can become damaged as a result of the dry ice embedding the items. There also remains a safety risk to users who may accidently touch dry ice and be subject to harmful ice burn in the process of trying to remove the items.

For such reasons, the technical issues involved with the loading, handling, and accessing of dry ice and items into tapered containers with a narrowed interior neck section and a single restrictive access opening have made their usage not viable for many applications.

All of such design challenges and design considerations have been recognized and addressed by the inventors. The present invention eliminates such handling, usage and transport issues with such tapered containers and offers a novel tapered container with a narrowed interior neck section, single restrictive access opening and interior body section wherein there is an optimal arrangement of items and dry ice within the internal volume of the container. In one aspect, the present invention is directed to an apparatus with a single restrictive access opening at the interior neck section for loading, removing, positioning or accessing one or more items that can be stored, preserved or transported in the presence of dry ice. The internal volume of the container is partitioned into a dry ice chamber and an internal product storage volume, both of which are separate and distinct and remain well-defined and non-overlapping during transport, usage, storage and handling. The internal product storage volume is arranged to be separate and distinct from the dry ice chamber such that removal or loading of the one or more items occurs without substantial disruption of the dry ice chamber. A barrier-like structure is optimally configured inside the interior volume of the container to prevent migration of the dry ice from the dry ice chamber into the internal product storage volume during usage, storage, preservation or transport of items in the container.

FIGS. 1 and 2 illustrate one possible apparatus in accordance with the principles of the present invention. FIG. 1 shows a schematic view of an apparatus 100 in a disassembled state. A barrier-like structure 2 is designed to be inserted within a tapered container 1 and then connected to the tapered container 1 to produce apparatus 100 as will be explained. Also illustrated in FIG. 1 is a guiding assembly 3, which when connected to apparatus 100 forms a resultant dry ice filling apparatus 200 of FIG. 5. The spatial arrows in FIG. 1 indicate the spatial relation of each of the components of the guiding assembly 3, barrier-like structure 2 and tapered container 1 relative to each other and prior to their assembly to form dry ice filling apparatus 200 (FIG. 5).

The tapered container 1 generally includes multiple walls 18, which are preferably vacuum insulated. The tapered container 1 has an interior volume 14 defined by an interior body section 10 and an interior neck section 11. As used herein and throughout, it should be understood that dual headed arrows are used in the embodiment of FIGS. 2a and 5 as well as the embodiment of FIGS. 6a, 8 and 10 to designate the internal depth of the interior body section 10 and the interior neck section 11 of container 1, respectively. It should be understood that other internal depths for interior body section 10 and interior neck section 11 are contemplated beside those illustrated in FIGS. 2a, 5, 6a, 8 and 10. The barrier-like structure 2 is connected to tapered container 1 to partition the interior volume 14 into a dry ice chamber 16 and an internal product storage volume 17 that is contained inside of the barrier-like structure 2. Items can be loaded into internal product storage volume 17 through the single restrictive access opening 15 to maintain the one or more items at or below a certain temperature for a certain duration to maintain preservation of the one or more items.

Figure 2A:
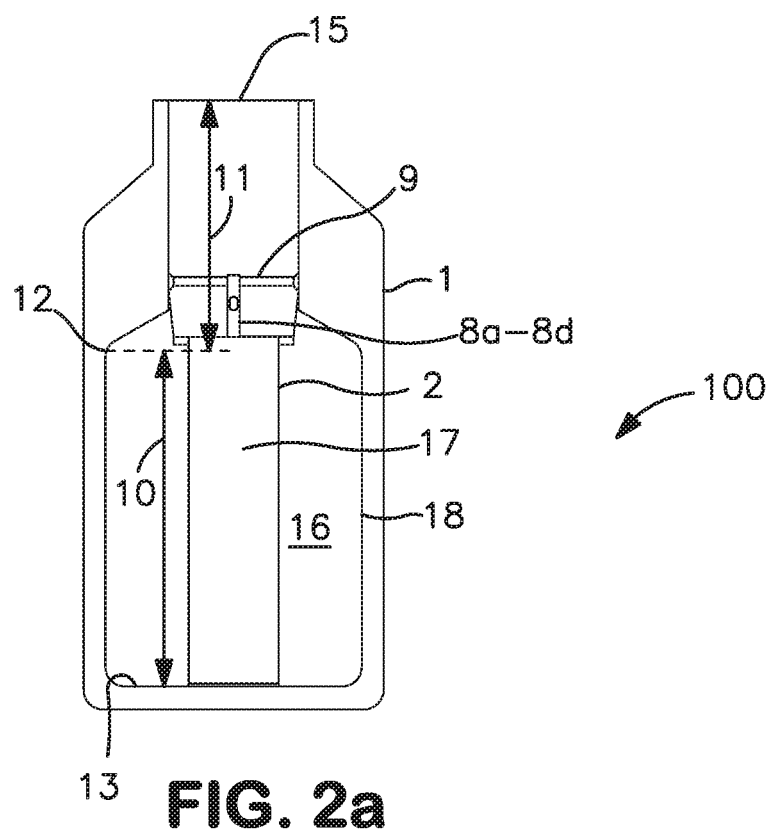
FIG. 2a illustrates a cross-sectional view of a barrier-like structure connected via bracket supports to a mounting ring affixed along an interior neck section of the tapered container of FIG. 1.
Figure 5:
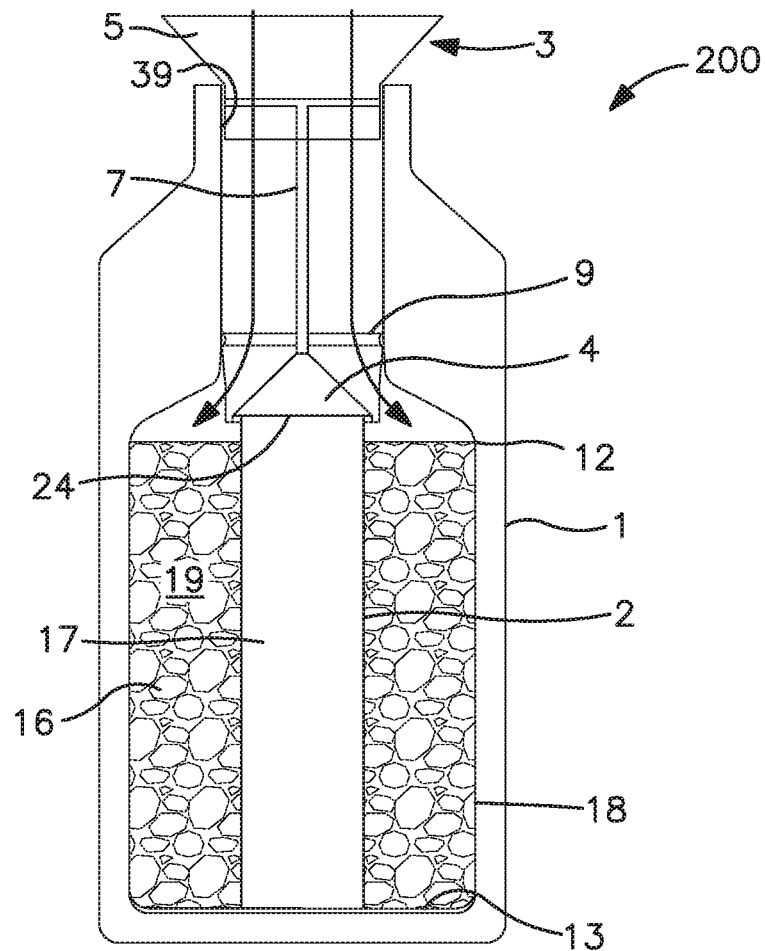
FIG. 5 illustrates a cross-sectional view of the barrier-like structure of FIGS. 1, 2a, 2b, 3a and 3b connected to the top portion of the tapered container of FIG. 1, with a guiding assembly placed on top of the tapered container to form a dry ice filling apparatus designed to selectively fill dry ice into the dry ice chamber but not the internal product volume within the barrier-like structure.

FIGS. 2a and 5 show that the interior body section 10 includes at least a dry ice chamber 16 into which dry ice 19 (as shown in FIG. 5) can be selectively directed. The dry ice chamber 16 extends within the interior body section 10 and represents an annular region that is bounded between the barrier-like structure 2 and the multiple walls 18 of the tapered container 1. The design of apparatus 100 using dry ice filling apparatus 200 ensures that substantially all of the dry ice 19 is introduced into the dry ice chamber 16 through the single restrictive access opening 15 which is located at the interior neck section 11. The interior body section 10 of the tapered container 1 is preferably optimized with regards to the (i) arrangement of the dry ice 19 and items and (ii) the volume capacity of the interior body section 10, so as to accommodate both the items and the dry ice 19 in a manner that produces acceptable cooling duration of the particular items without a need for increasing the size and weight of the overall tapered container 1 and without having to introduce an excessive amount of dry ice 19 to create the required cooling duration of the particular items. The dry ice chamber 16 is designed to receive only dry ice 19 and as such is characterized by an absence of foam-filled material or any other type of absorbent as is typically used with liquid nitrogen cryogenic containers. The dry ice chamber 16 is surrounded by multiple walls 18 (preferably vacuum insulated).

Figure 2B:
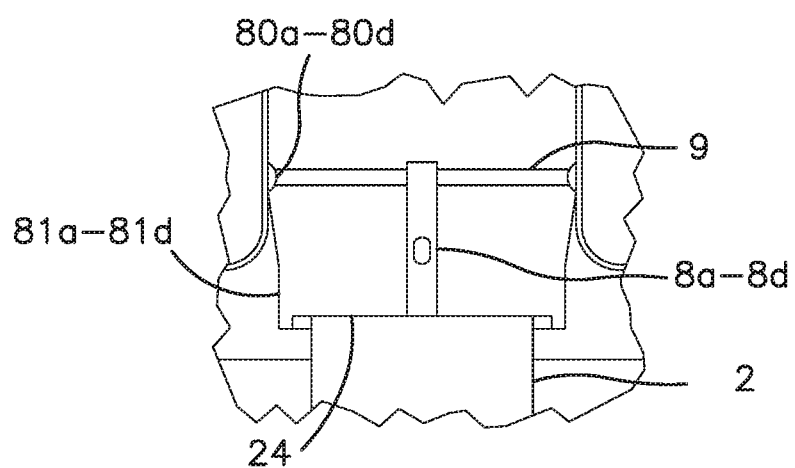
FIG. 2b shows an enlarged cross-sectional view of the top portion of FIG. 2a, in which the bracket supports of the barrier-like structure can be seen in greater detail connected to the mounting ring affixed along the internal neck section of the tapered container of FIG. 1.

The interior volume 14 of tapered container 1 also includes an internal product storage volume 17 that is non-overlapping with the dry ice chamber 16. The internal product storage volume 17 is situated inside of the barrier-like structure 2 and is characterized by a substantial absence of dry ice 19. The internal product storage volume 17 is accessible through the single restrictive access opening 15. An opening along a top flat ring 24 of the barrier-like structure 2 provides entry into the internal product storage volume 17. The opening of the barrier-like structure 2 is preferably substantially aligned with the single restrictive access opening 15. The top flat ring 24 of the barrier-like structure 2 is shown in FIGS. 2a, 2b and 5 to be oriented so as to be facing towards the single restrictive opening 15. A bottom portion of the barrier-like structure 2 is in contact or close proximity to a floor 13 of the tapered container 1. The internal product storage volume 17 preferably has a volume capacity that extends between the top flat ring 24 and the bottom portion of the barrier-like structure 2. The barrier-like structure 2 can be oriented so as to be situated solely in the interior body section 10 or within portions of the interior neck section 11 and the interior body section 10. Other examples of the barrier-like structure 2 which will be described below contemplate the barrier-like structure 2 residing solely in the interior neck section 11.

In one embodiment of the present invention, the barrier-like structure 2 is a tube-like structure. It should be understood that any other suitable shape can be utilized. For example, the barrier-like structure 2 can be meshed or solid or another functionally equivalent structure, whereby the barrier-like structure 2 has certain structural features and possesses sufficient rigidity (i) to substantially prevent entry, migration or introduction of dry ice 19 from the dry ice chamber 16 into the internal product storage volume 17 during storage, transport, and handling of the tapered container 1; (ii) hold the resultant dry ice 19 in a substantial stationary position during selective filling of dry ice 19 into the dry ice chamber 16, but not the internal product storage volume 17; and/or (iii) impart resistance against the dry ice 19 in the dry ice chamber 16, thereby potentially increasing the amount of dry ice 19 capable of occupying the dry ice chamber 16 by virtue of the dry ice 19 having an increased packing density within the dry ice chamber 16. As a result of structural attributes (i), (ii) and/or (iii), the barrier-like structure 2 prevents the dry ice 19 from collapsing and embedding the one or more items loaded into the internal product storage volume 17 while maintaining the one or more items within internal product storage volume 17 at or below a certain temperature for storage, preservation or transport of the one or more items. By maintaining the dry ice chamber 16 with dry ice 19 separate and distinct from the one or more items within the internal product storage volume 17 that is located in barrier-like structure 2, the items can be accessed (e.g., removed) from the tapered container 1 without the need to discard dry ice 19 from the dry ice chamber 16.

It should be understood that the barrier-like structure 2 can also be permanently affixed within the interior neck section 11 and/or interior body section 10 without departing from the scope of the present invention. When permanently affixed to the floor 13 of interior body section 10, barrier-like structure 2 need not be enclosed along its bottom portion. It should also be understood that the barrier-like structure 2 does not need to be temporarily or permanently connected to tapered container 1, but having a connection is preferable to facilitate substantial alignment of the internal product storage volume 17 with the single restrictive access opening 15 and to prevent movement of the barrier-like structure 2 within tapered container 1 during subsequent handling of tapered container 1.

FIGS. 1-2 indicate that the single restrictive access opening 15 constitutes the sole access opening into the interior neck section 11 and then into the interior body section 10 for purposes of minimizing heat ingress into the interior volume 14 of the tapered container 1 either when single restrictive access opening 15 is open or closed by an insulated cap, plug, or similar closure device. The single restrictive access opening 15 generally is a size that is difficult or not possible to access. The single restrictive access opening 15 has a diameter or cross-sectional area that is substantially smaller than the diameter or cross-sectional area of the interior body section 10 of tapered container 1. In one example, the single restrictive access opening 15 is circular-shaped. The single restrictive access opening 15 is preferably located along the top-most portion of the interior neck section 11 for purposes of minimizing heat ingress into the tapered container 1. The interior neck section 11 has a depth defined by a vertical length measured from the single restrictive access opening 15 that extends into the interior volume 14 of tapered container 1 and terminates at the top-most section 12 of the interior body section 10, which is wider than the narrower interior neck section 11. The inner wall of interior neck section 11 is preferably composed of a material that is a poor conductor of heat. The depth of the interior neck section 11 is preferably a sufficient length to allow an acceptable level of heat ingress from the surrounding environment into the tapered container 1 to achieve the intended duration of dry ice within tapered container 1. The interior body section 10 of FIGS. 1-2 is sized to receive dry ice 19 solely within a dry ice chamber 16. FIG. 2a shows that the interior body section 10 extends from a top-most section 12 to a floor 13 of tapered container 1.

FIG. 5 is a cross-sectional view of a dry ice filling apparatus 200 with barrier-like structure 2 secured into position within the interior neck section 11 of tapered container 1 and with dry ice 19 occupying only the dry ice chamber 16. The bottom of the barrier-like structure 2 is shown in close proximity or contacting the floor 13 of tapered container 1. In particular, the dry ice chamber 16 is located external to and surrounds a centralized internal product storage volume 17, which is substantially aligned with the single restrictive access opening 15 of interior neck section 11. The dry ice chamber 16 can receive dry ice 19 that is fed through guiding assembly 3 (as will be described in greater detail hereinbelow), and the internal product storage volume 17 can receive one or more items. The dry ice 19 occupies the floor 13 of tapered container 1 within dry ice chamber 16, but the dry ice 19 does not occupy the inside of barrier-like structure 2. FIG. 5 shows that the introduction of additional dry ice 19 into tapered container 1 through the single restrictive access opening 15 causes the dry ice 19 to accumulate in an upwards direction within dry ice chamber 16, but exterior to the barrier-like structure 2. The barrier-like structure 2 is vertically oriented and has structural features that prevent entry, migration or introduction of dry ice 19 from the dry ice chamber 16 into the internal product storage volume 17, thereby preserving the integrity of the dry ice chamber 16 and the internal product storage volume 17 during storage, preservation or transport as well as during access of the dry ice chamber 16 and the internal product storage volume 17. When filling dry ice chamber 16 with dry ice 19, the opening of the barrier-like structure 2 along its top flat ring 24 is blocked by engagement of the guiding assembly 3, as shown in FIG. 5.

Figures 3A, 3B:
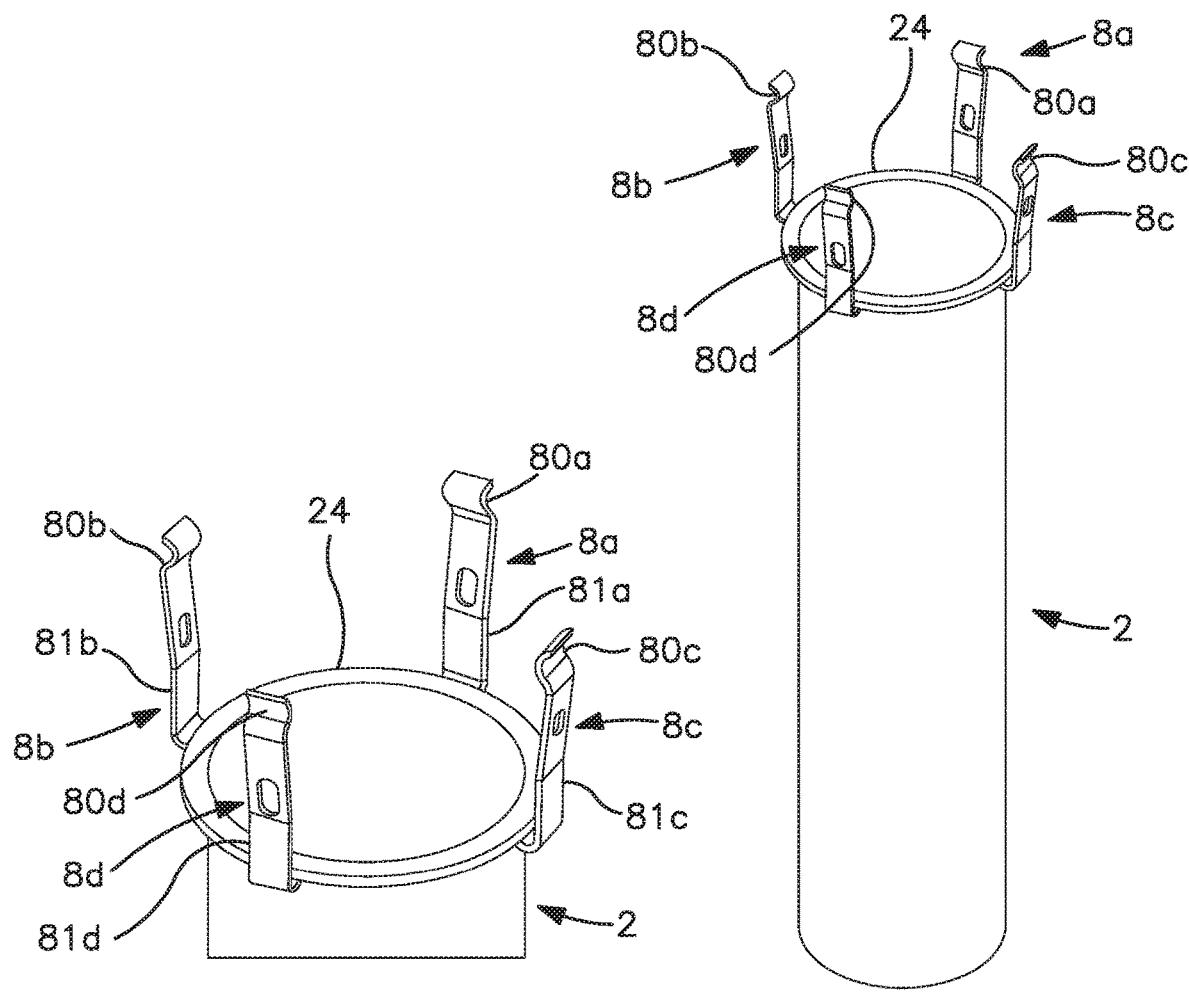
FIG. 3a illustrates a perspective view of the barrier-like structure of FIG. 1 with bracket supports extending along a top edge thereof.
FIG. 3b is an enlarged version of FIG. 3a along the top of barrier-like structure 2.

It should be understood, that the barrier-like structure 2 can be designed to connect to any portion of tapered container 1, such as the outside or the inside of tapered container 1 at either the interior neck section 11, the interior body section 10, or an exterior section of the tapered container 1. One example for connecting the barrier-like structure 2 to the tapered container 1 is shown in FIGS. 3a and 3b. The barrier-like structure 2 has bracket supports 8a, 8b, 8c and 8d as shown in FIGS. 3a and 3b. FIG. 3a is a perspective view of the barrier-like structure 2 with corresponding bracket supports 8a, 8b, 8c and 8d situated along the top flat ring 24 of the barrier-like structure 2. FIG. 3b is an enlarged version of FIG. 3a along the top of barrier-like structure 2. Each of the bracket supports 8a, 8b, 8c and 8d is secured to a mounting ring 9 affixed along the interior neck section 11 in tapered container 1 as more clearly seen in FIG. 2b. The bracket supports 8a, 8b, 8c and 8d are secured on the mounting ring 9 when the barrier-like structure 2 is connected to the tapered container 1. The structural features of the bracket supports 8a, 8b, 8c and 8d are shown in FIG. 3a and an enlarged version is shown in FIGS. 2a, 2b and 3b. Each of 4 bracket supports 8a, 8b, 8c and 8d is a spring-based structure having corresponding spring-like portions 81a, 81b, 81c and 81d. Each of the free ends of the corresponding bracket supports 8a, 8b, 8c and 8d have inwardly bent hooks 80a, 80b, 80c and 80d to catch hold of and hang onto the mounting ring 9 (FIG. 2b). In this manner, each of the inwardly bent hooks 80a, 80b, 80c and 80d of the bracket supports 8a, 8b, 8c and 8d remain latched onto mounting ring 9 with sufficient outward spring force. The outward spring force from spring-like portions 81a, 81b, 81c and 81d ensures that their corresponding bracket supports 8a, 8b, 8c and 8d remain connected to the mounting ring 9 of tapered container 1 at all times during storage, preservation, transport and/or access into the tapered container 1. By way of example, during storage and transport, the spring-based properties of the bracket supports 8a, 8b, 8c and 8d desirably provide sufficient outward spring force along the mounting ring 9 to avoid detachment therefrom during any impact, vibration and shock that may be incurred during storage and transport. Any suitable spring-based structure for bracket supports 8a, 8b, 8c and 8d is contemplated that is capable of securing the barrier-like structure 2 with the mounting ring 9 on the tapered container 1. Although FIGS. 3a and 3b show that each of the four bracket supports 8a, 8b, 8c and 8d are spaced apart approximately ninety degrees from each other, it should be understood more than four or less than four bracket supports are contemplated in any spaced apart orientation from each other to generate the required spring force to maintain connection of the bracket supports 8a, 8b, 8c and 8d onto mounting ring 9. The barrier-like structure 2 can be disengaged from the mounting ring 9 of tapered container 1 and then removed from the interior of tapered container 1, as will be described below.

Each of the bracket supports 8a, 8b, 8c and 8d is connected to a top flat ring 24 of barrier-like structure 2. The top flat ring 24 is preferably located along an external surface, as can be more clearly seen in FIGS. 3a, 3b and 4c. The top flat ring 24 provides a structural element designed to permit engagement with a barrier removal tool 50 during removal of barrier-like structure 2 from the interior volume 14 of tapered container 1 (as will be described in more detail below with regards to FIG. 4f).

Figure 4A:
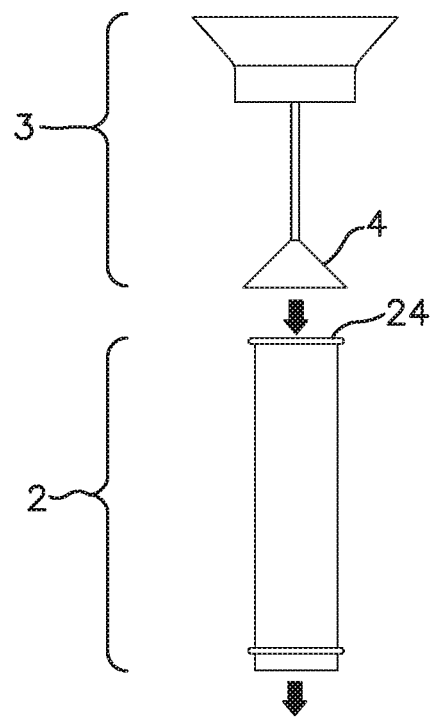
FIG. 4a illustrates a guiding assembly, barrier-like structure and tapered container disassembled from each other, with the spatial relation of each of the components relative to each other and prior to their assembly as shown by the spatial arrows located between the guiding assembly and the barrier-like structure and between the barrier-like structure and the tapered container to form an apparatus.
Figure 4B:
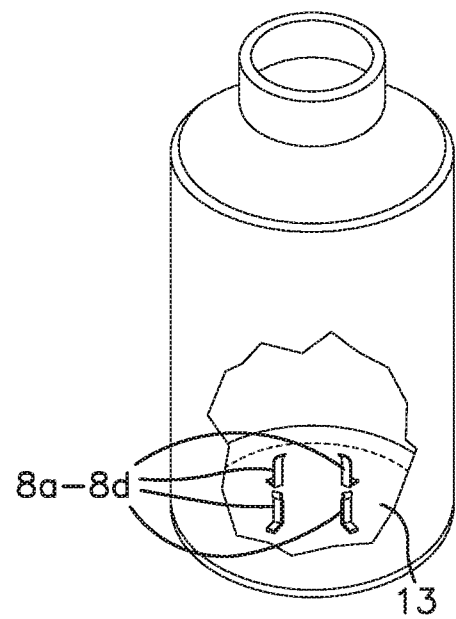
FIG. 4b illustrates a partial cut-away perspective view of the tapered container of FIG. 4a with support brackets located along a floor of the tapered container.
Figures 4C, 4D:
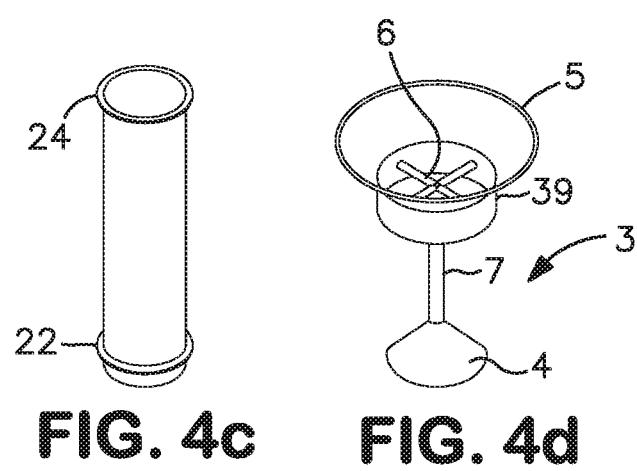

An exemplary filling apparatus for filling dry ice 19 selectively into only the dry ice chamber 16 of interior volume 14 of tapered container 1 will now be discussed with reference to FIGS. 4d and 5. FIG. 5 shows a cross-sectional view of a dry ice filling apparatus 200 in an assembled state, which primarily includes apparatus 100 connected to a guiding assembly 3. The guiding assembly 3 is used to selectively fill dry ice 19 only into dry ice chamber 16 of the tapered container 1 when guiding assembly 3 is properly oriented and connected to top flat ring 24 of barrier-like structure 2. Guiding assembly 3 includes a funnel 5 with an extended ring 39 below the funnel 5, an elongated portion 7 and a removable cap structure 4. Guiding assembly 3 is extended through the single restrictive access opening 15 until removable cap structure 4 engages with a top flat ring 24 of the barrier-like structure 2, which has been previously connected within interior volume 14 of tapered container 1. The resultant engagement of the guiding assembly 3 to the top flat ring 24 of barrier-like structure 2 is shown in FIG. 5. By engaging the guiding assembly 3 to the top flat ring 24 of barrier-like structure 2, the opening of the barrier-like structure 2 along the top flat ring 24 is blocked, thereby preventing entry of dry ice 19 into the interior product storage volume 17 located inside of the barrier-like structure 2. Referring to FIG. 5, the funnel 5 flares out from the interior neck section 11 of tapered container 1 and provides an outwardly flared surface into which a user can readily feed dry ice 19. The dry ice 19 can be manually or mechanically fed into funnel 5. When dry ice 19 is fed into the funnel 5 of guiding assembly 3, the dry ice 19 falls through the bottom opening of funnel 5, enters into the single restrictive access opening 15, and then impinges upon a surface of removable cap structure 4. When the dry ice 19 impinges upon the removable cap structure 4, the outwardly flared surface of the removable cap structure 4 provides a selected pathway that causes the dry ice 19 to be directed into the dry ice chamber 16 situated external to the barrier-like structure 2. Dry ice 19 does not fall into the internal product storage volume 17, as a consequence of the removable cap structure 4 covering and thereby blocking the top flat ring 24 of barrier-like structure 2. The flow path of the dry ice 19 is indicated by the dual arrows of FIG. 5.

In this manner, as dry ice 19 continues to be fed, the dry ice 19 accumulates to a desired level within the dry ice chamber 16 without entry into internal product storage volume 17, and the dry ice occupying the dry ice chamber 16 remains in the dry ice chamber 16.

The filling apparatus 200 that is used to fill dry ice will now be described in greater detail. The filling apparatus 200 includes a tapered container 1, barrier-like structure 2, and guiding assembly 3 connected to each other with the spatial relation of each of the components relative to each other and prior to their assembly as shown by the spatial arrows in FIG. 1. FIG. 4*d* shows the guiding assembly 3 includes a removable cap structure 4, a funnel 5, elongated portion 7, extended ring 39 and arm-like structures 6. Each of the components can be made from any suitable material, including plastic or metal. The elongated portion 7 connects the removable cap structure 4 to the funnel 5. The top end of the elongated portion 7 has arm-like structures 6 which connect along an inner surface of the funnel 5. The bottom of the funnel 5 includes an extended ring 39 with the opening of the ring 39 substantially similar in size to the single restrictive access opening 15. The extended ring 39 can loosely fit into the interior neck section 11. As shown in FIGS. 1, 4*d* and 5, the bottom of the removable cap structure 4 has an opening that can be placed onto the top flat ring 24 of the barrier-like structure 2 to create a press fit connection. The removable cap structure 4 is sized to pass into the single restrictive access opening 15 of interior neck section 11. The guiding assembly 3 is also designed to have the opening of the removable cap structure 4 slightly smaller than the mounting ring 9 in the tapered container 1 to enable the removable cap structure 4 to extend downwards and beyond the mounting ring 9 of tapered container 1 and then be oriented to fit onto the top flat ring 24 of the barrier-like structure 2 (FIG. 5). FIG. 5 shows that the mounting ring 9 can be situated within the interior neck section 11. As such, the extended ring 39 can partially penetrate into the single restrictive access opening 15 as is required to have the removable cap structure 4 placed on the top flat ring 24 of barrier-like structure 2. Having connected guiding assembly 3 in this manner to the top flat ring 24 of barrier-like structure 2 of apparatus 100 to produce resultant filling apparatus 200, dry ice 19 can now be fed into the flared opening of funnel 5 to begin the accumulation of dry ice 19 into dry ice chamber 16.

Additionally, the guiding assembly 3 can be utilized to install barrier-like structure 2 into the interior volume 14 of tapered container 1. At least a portion of the elongated portion 7 and the removable cap structure 4 extend in a downward direction though the single restrictive access opening 15 of interior neck section 11 of tapered container 1 until the removable cap structure 4 is engaged and connected to top flat ring 24 of barrier-like structure 2. Specifically, by pressing the removable cap structure 4 of guiding assembly 3 onto the top flat ring 24 of the barrier-like structure 2, the extended ring 39 below the funnel 5 can be used to guide the installation of the barrier-like structure 2 in a downward direction and preferably in a centralized orientation (e.g., a centralized orientation being defined herein as a top flat ring 24 and corresponding top opening of barrier-like structure 2 in substantial alignment with the single restrictive access opening 15 along interior neck section 11) until the barrier-like structure 2 is in a position to mechanically engage with the mounting ring 9 in tapered container 1, in the manner previously described, whereby each of the bracket supports 8*a*, 8*b*, 8*c* and 8*d* of barrier-like structure 2 can engage and connect with mounting ring 9. During such installation, the outer diameter formed by the bracket supports 8*a*, 8*b*, 8*c* and 8*d* are greater than the mounting ring 9 inner diameter, which requires the inwardly bent hooks 80*a*, 80*b*, 80*c* and 80*d* of corresponding bracket supports 8*a*, 8*b*, 8*c* and 8*d* to be pushed or bent further inwards to allow inwardly bent hooks 80*a*, 80*b*, 80*c* and 80*d* to latch onto mounting ring 9 with sufficient outward spring force created by each of the corresponding spring-like portions 81*a*, 81*b*, 81*c* and 81*d*.

Figure 4F:
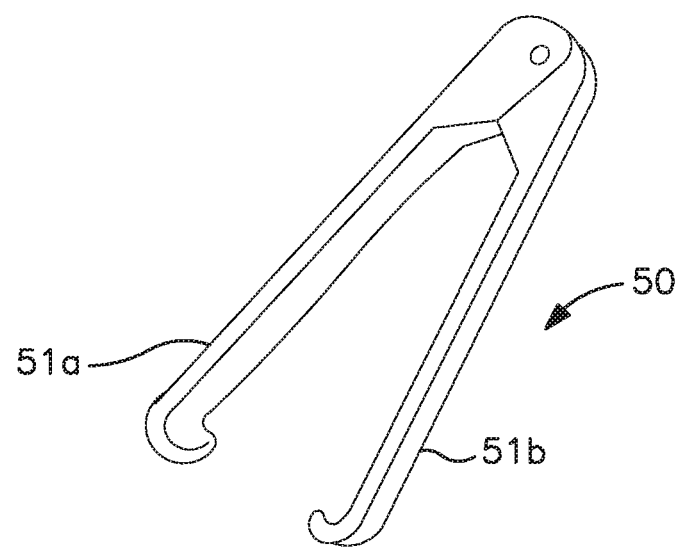
FIG. 4f illustrates one representative removal tool for detaching the barrier-like structure from inside of the tapered container and thereafter pulling the detached barrier-like structure out of the tapered container.
Figure 4E:
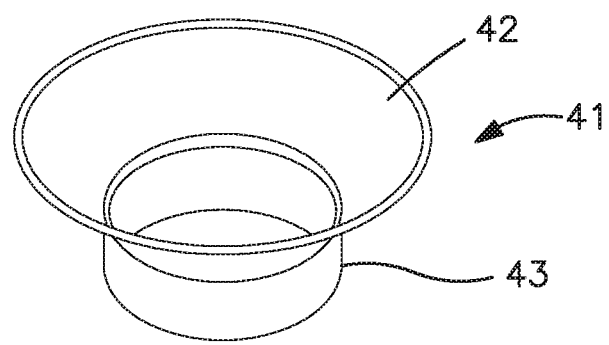
FIG. 4e illustrates an alternative guiding assembly structure having a funnel and extended ring below the funnel.

Other guiding assemblies are contemplated. FIG. 4*e* shows another example of a guiding assembly 41. The guiding assembly 41 includes an outwardly flared funnel structure 42 and an extended ring 43. Guiding assembly 41 represents a simplified design approach over guiding assembly 3, as it does not include an elongated portion 7 with arm-like structures 6 and a removable cap structure 4. Selection of the exact guiding assembly to use for filling dry ice chamber 16 and guiding barrier-like structure 2 into tapered container 1 for installation may depend on several factors, including the size and geometry of the tapered container to be utilized as well as the type of barrier-like structure employed within tapered container 1. For example, guiding assembly 41 may be suitable for usage with an apparatus that employs a flexible bag 30 as the barrier-like structure, which will be described in greater detail below.

Referring to FIG. 5, after the desired amount of dry ice 19 is filled into the dry ice chamber 16, but not the internal product storage volume 17, the guiding assembly 3 can be grasped along the funnel 5 and then lifted upwards to enable removable cap structure 4 to be disengaged from top flat ring 24 of barrier-like structure 2 and then lifted upwards until the guiding assembly 3 is entirely removed from the apparatus 100. The barrier-like structure 2 remains secured and mounted onto mounting ring 9 in tapered container 1. The top portion of barrier-like structure 2 is now unobstructed to allow items to be introduced (if not previously introduced) into the internal product storage volume 17 of the barrier-like structure 2.

Any sequence of assembly of apparatus 200 and the process of filling the dry ice chamber 16 with dry ice 19 is contemplated. For example, it should be understood that with barrier-like structure 2 secured to tapered container 1, the one or more items can be introduced into the internal product storage volume 17 before or after the filling of dry ice 19 into the dry ice chamber 16.

Still further, the items can be loaded into the internal product volume 17 of detached barrier-like structure 2 first, with barrier-like structure 2 either outside or inside tapered container 1. Then, guiding assembly 3 can be utilized to engage and connect with barrier-like structure 2 along top flat ring 24 of barrier-like structure 2, followed by guiding the barrier-like structure 2 connected to guiding assembly 3 in a downward direction until the bracket supports 8*a*, 8*b*, 8*c* and 8*d* are secured with the mounting ring 9 in the tapered container 1 as described hereinbefore. Loading the items into the barrier-like structure 2 prior to connecting the barrier-like structure 2 to tapered container 1 requires that the barrier-like structure 2 be at least partly closed along its bottom portion so as to prevent the items from falling out of the bottom of the barrier-like structure 2. The barrier-like structure 2 becomes positioned into the interior volume 14 of tapered container 1, preferably in a centralized orientation (e.g., a centralized orientation being defined herein as a top flat ring 24 and corresponding top opening of barrier-like structure 2 in substantial alignment with the single restrictive access opening 15 of interior neck section 11). Having secured the barrier-like structure 2 to tapered container 1, dry ice 19 can now be fed into funnel 5 of guiding assembly 3 to selectively fill the dry ice chamber 16, but not the internal product storage volume 17. Upon completion of filling, which is defined as accumulating a predetermined level of dry ice 19 within dry ice chamber 16 without substantial entry, introduction or migration of dry ice 19 into the internal product storage volume 17, the guiding assembly 3 is disengaged and removed from the top flat ring 24 of barrier-like structure 2.

In addition, it is possible that the loading of multiple items into the internal product storage volume 17 and dry ice 19 into the dry ice chamber 16 can be accomplished in multiple steps or at different points in time. For example, a first set of items may be loaded into the detached barrier-like structure 2 followed by connection of the barrier-like structure 2 to tapered container 1 and filling of dry ice 19 into the dry ice chamber 16 as described above, and at a later time, a second set of items may be loaded into the internal product volume 17 within tapered container 1. As another example, the apparatus 200 may be prepared in accordance with the methods above followed by loading dry ice 19 into the dry ice chamber 16 and then loading one or more items into the internal product volume 17, and at a later time, additional dry ice 19 can be loaded into the dry ice chamber 16 using guiding assembly 3. As will be obvious to those skilled in the art, many combinations of sample loading, accessing, or removing events and dry ice loading events are possible.

A cap (not shown) closes the single restrictive access opening 15. A cap with mechanical seal is inserted into the single restrictive access opening 15 of tapered container 1 to create confinement of the internal volume 14 of tapered container 1 with one or more items within internal product storage volume 17 during storage, preservation and/or transport of the one or more items contained therein. Generally speaking, the caps employed in all embodiments of the present invention are preferably loose-fitting and not hermetically sealed to permit escape of sublimated dry ice to the surrounding environment and thereby prevent build-up of internal pressures arising from sublimation of solid dry ice. Additionally, the caps are made of a suitable insulative material to prevent ingress of heat into the tapered container 1, thereby avoiding excessive sublimation of the dry ice 19 from the dry ice region 16. In one example, the cap with mechanical seal contains a zigzag channel or passageway through which sublimation of dry ice 19 into $CO_2$ off-gas can escape out of tapered container 1, thereby substantially eliminating pressure buildup of $CO_2$ gas that is formed during storage, preservation or transport of items in the tapered container 1. The spacing of the passageway is preferably optimized so as to minimize heat gain of the interior of tapered container 1 from the atmosphere while allowing $CO_2$ off gas venting to prevent pressure build-up in the tapered container 1. Other channel designs which vent excess $CO_2$ pressure while minimizing heat gain of the tapered container 1 are contemplated. The apparatus 100 with cap is now ready to store or be transported with the one or more items contained therein.

When the desired storage interval for the items has elapsed or apparatus 100 reaches a destination site where the items are needed, the items contained inside internal product storage volume 17 can be retrieved. In one embodiment, the items can be retrieved from within barrier-like structure 2 without removing barrier-like structure 2 from tapered container 1. One notable advantage of this inventive method for removal of items is the avoidance of discarding dry ice 19 from dry ice chamber 16, thereby enabling facile re-use of tapered container 1 for storing, preserving or transporting additional items and reducing risks of safety hazards associated with dry ice spillage or user exposure. Additionally, the dry ice 19 remains in its intended position within dry ice chamber 16. Accordingly, the present invention allows introducing one or more items into the internal product storage volume 17 of the barrier-like structure 2 after the original one or more items are removed. The dry ice 19 remains positioned within the dry ice chamber 16. Additional dry ice 19 can be introduced if necessary, in accordance with the principles of the present invention.

In another embodiment, the barrier-like structure 2 can be removed from tapered container 1, and then items can be retrieved from within the removed barrier-like structure 2 (i.e., while the barrier-like structure 2 is outside tapered container 1). Retrieving the items from within barrier-like structure 2 after removal of the barrier-like structure 2 from tapered container 1 requires that the barrier-like structure 2 be at least partly closed along its bottom portion so as to prevent the items from falling out of the bottom of the barrier-like structure 2. Barrier-like structure 2 may also be removed from tapered container 1 to allow for cleaning of the interior volume 14 of tapered container 1.

In one example, a removal tool is utilized to remove the barrier-like structure 2. One representative example of a removal tool is shown in FIG. 4f. FIG. 4f shows a removal tool 50 having a hook-like structure with grasping arms 51a and 51b. The tips of the grasping arms 51a and 51b can be placed under the top flat ring 24 of barrier-like structure 2 as a means to disconnect the bracket supports 8a, 8b, 8c and 8d from the mounting ring 9 of tapered container 1. Having disconnected the bracket supports 8a, 8b, 8c and 8d from the mounting ring 9 of tapered container 1, the removal tool 50 with top flat ring 24 now secured between grasping arms 51a and 51b can be lifted upwards. In this manner, the barrier-like structure 2 is withdrawn from interior volume 14 of tapered container 1.

It should be understood that the methods for removal of one or more items from barrier-like structure along with the sequence for installing barrier-like structure, loading one or more items therein and filling dry ice chamber with dry ice as described herein are applicable to all of the types of barrier-like structures contemplated by the present invention.

The embodiments described hereinbefore are intended to show one possible specific connection between the barrier-like structure 2 and tapered container 1 for purposes of illustrating an example for carrying out the principles of the present invention. However, it should be understood that any other suitable attachment means for connecting the barrier-like structure 2 to the tapered container 1 is contemplated. For example, in another embodiment, the barrier-like structure 2 may be permanently mounted inside the interior volume 14 of tapered container 1, for example, by welding or chemically bonding the barrier-like structure 2 to the interior neck section 11 or to the floor 13 or other portion of the interior body section 10. Still further, the barrier-like structure 2 is not connected to the tapered container 1, but rather can be positioned within the tapered container 1 with dry ice 19 introduced around the barrier-like structure 2 as described herein. FIGS. 4a-4d, 6a, 6b and 6c show yet another embodiment in which bracket supports 8a, 8b, 8c and 8d are located along the floor 13 of tapered container 1. FIG. 6c illustrates an enlarged cross-sectional view of the bracket supports 8a, 8b, 8c and 8d affixed to a floor 13 of tapered container 1, in which the bracket supports 8a, 8b, 8c and 8d are in mechanical engagement with a bottom mounting ring 22 along the bottom portion of an external surface of barrier-like structure 2. The structural features of bracket supports 8a, 8b, 8c and 8d on floor 13 are identical to those previously described that are located on a top flat ring 24 of barrier-like structure 2. Installation of barrier-like structure 2 into tapered container 1 can occur using guiding assembly 3 as previously described herein with respect to the apparatus 100 described in the embodiment of FIGS. 1, 2, 3b and 5.

Figure 6B:
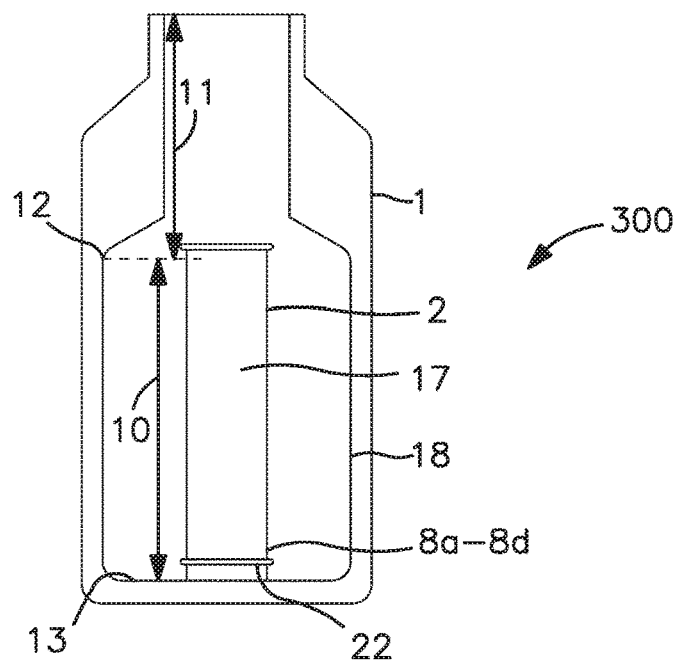
FIG. 6b illustrates a cross-sectional view of the barrier-like structure of FIGS. 4a and 4c connected to the bottom portion of the tapered container of FIGS. 4a and 4b.
Figure 6A:
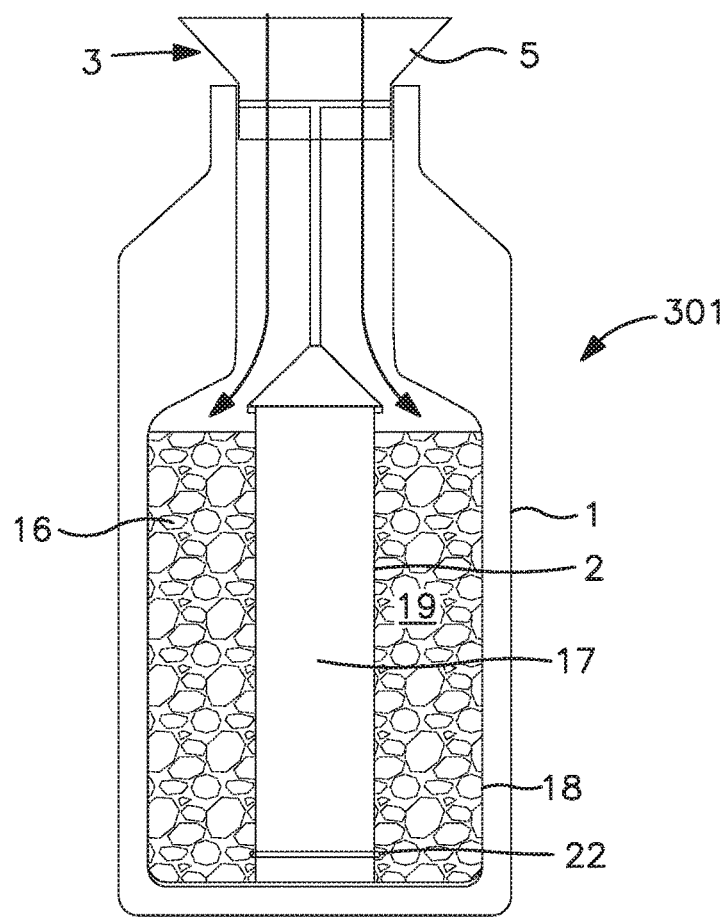
Figure 6C:
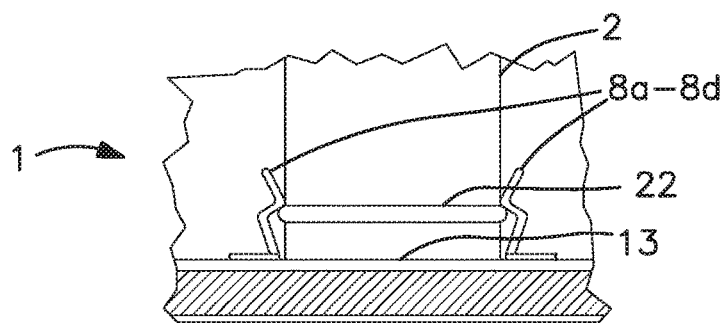
FIG. 6c illustrates an enlarged cross-sectional view of the bottom portion of FIG. 6b showing in greater detail the bracket supports affixed to a floor of the tapered container, in which the bracket supports are in mechanical engagement with a mounting ring affixed along the bottom portion of the barrier-like structure.

The bracket supports 8a, 8b, 8c and 8d are located approximately 90 degrees from each other, and at a radial distance that is in alignment or corresponds to the periphery of bottom portion of barrier-like structure 2 such that lowering of the barrier-like structure 2 allows the bottom mounting ring 22 of barrier-like structure 2 to engage and connect with the bracket supports 8a, 8b, 8c and 8d along floor 13, thereby mounting the barrier-like structure 2 into a stationary and vertically upright position within interior volume 14 of tapered container 1, as shown in FIGS. 6a, 6b and 6c. The resultant apparatus 300 of barrier-like structure 2 connected to floor 13 of tapered container 1 is shown in FIG. 6b. Similar to apparatus 100, apparatus 300 can be used to selectively fill dry ice 19 into dry ice chamber 16, but not internal product storage volume 17 as described hereinbefore with use of a guiding assembly 3 that is connected to apparatus 300 to form a dry ice filling apparatus 301, as shown in FIG. 6a. FIG. 6a represents a dry ice filling apparatus 301 employed for selectively filling dry ice 19 into dry ice chamber 16, as indicated by the dual arrow flow lines in FIG. 6a. The guiding assembly 3 connects to top flat ring 24 of barrier-like structure 2, thereby preventing entry of dry ice 19 into the internal product storage volume 17 located inside of barrier-like structure 2. The filling procedure can occur as described with respect to FIG. 5.

Removal of barrier-like structure 2 from bracket supports 8a, 8b, 8c and 8d of floor 13 of tapered container 1 can occur by disengaging mounting ring 22 from bracket supports 8a, 8b, 8c and 8d. A suitable grasping tool such as a retrieval tool 50 (FIG. 4f) can be used whereby arms 51a and 51b can grasp onto a top portion (e.g., top flat ring 24) of barrier-like structure 2. Referring to FIG. 6c, the retrieval tool 50 with top portion of barrier-like structure 2 attached to arms 51a and/or 51b is pulled upwards with sufficient force to cause the mounting ring 22 at the bottom of barrier-like structure 2 to detach from bracket supports 8a, 8b, 8c and 8d, as a result of the pulling force being greater than the spring-like engagement force of the mounting ring 22 to the bracket supports 8a, 8b, 8c and 8d. Removal may be required when a user has a need to clean the interior volume 14 of tapered container 1 or to load, access or remove one or more items within the internal product storage volume 17 located inside of barrier-like structure 2.

Figures 7A, 7B, 7C:
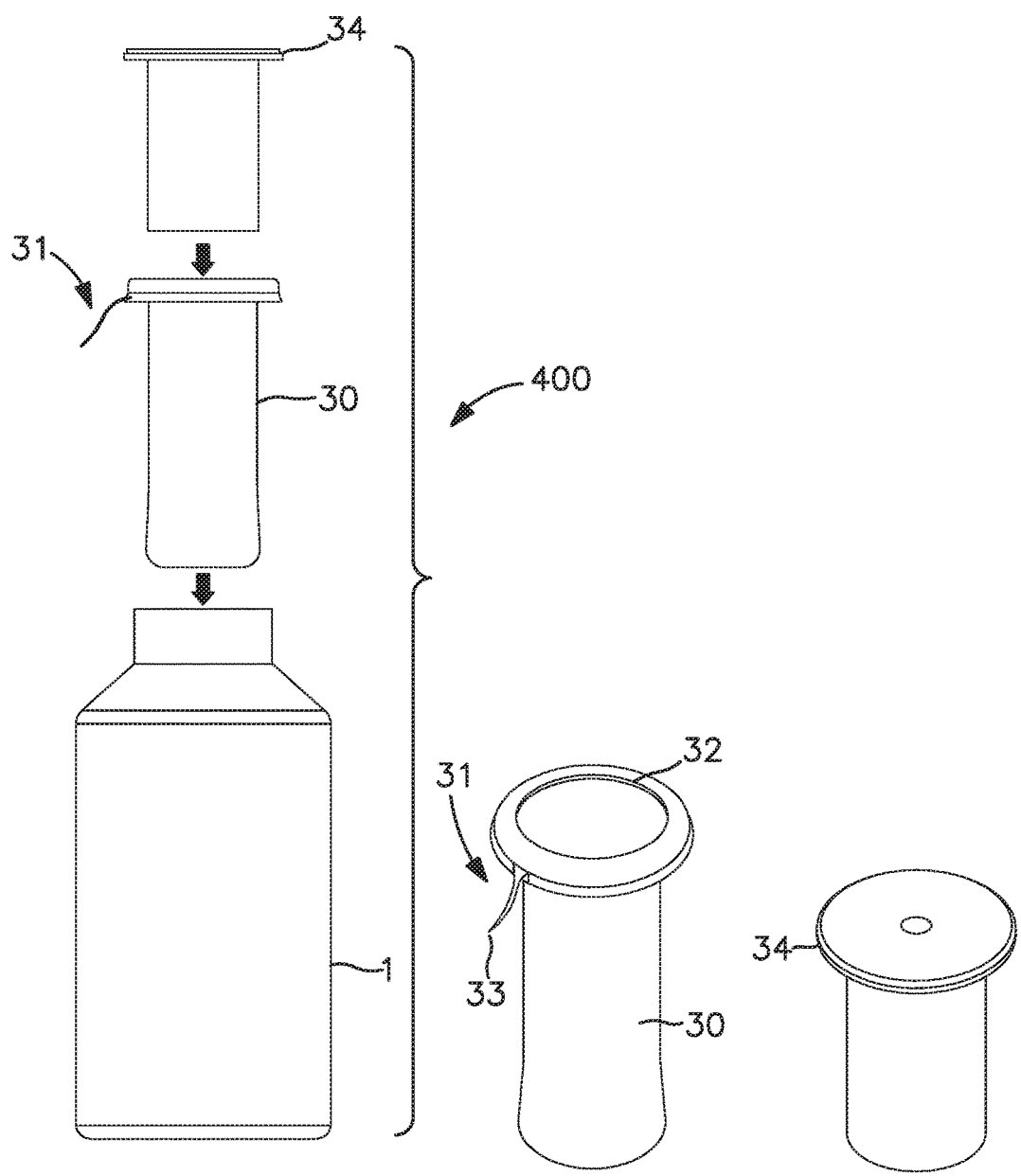

The present invention contemplates any suitable type of barrier-like structure 2 capable of excluding dry ice 19 from migrating into internal product storage volume 17 while maintaining the integrity of the one or items stored within internal product storage volume 17. For example, another embodiment of the present invention is directed to a barrier-like structure 2 that can be characterized as a flexible bag having a flexible access opening for accessing an interior region suitable to receive one or more items therein. A first portion of the flexible bag is secured to the tapered container 1, and a second portion of the flexible bag extends at least partially into the single restrictive access opening 15 of the interior neck section 11 so as to remain in a suspended orientation within the interior neck section 11 or the interior body section 10 or within both the interior neck section 11 and the interior body section 10 of the tapered container 1. In this regard, FIGS. 7a-7c and 8 show apparatus 400, which includes tapered container 1, flexible bag 30 and insulated cap 34. FIG. 7a indicates the spatial relation of each of the components of tapered container 1, flexible bag 30 and insulated cap 34 relative to each other and prior to their assembly to form apparatus 400. Flexible bag 30 has a tether 31 to open and close a flexible opening 32 into the interior region of flexible bag 30. The tether 31 extends along the periphery of the top portion of flexible bag 30. Pulling on a free end 33 of the tether 31 reduces the diameter of the flexible opening 32 along the top thereof. The tether 31 can be pulled until the flexible opening 32 into the interior region of flexible bag 30 is closed, thereby securing the one or more items that may be loaded therein. The free ends 33 of the tether 31 can be tied to an exterior section of tapered container 1. The flexible bag 30 can be composed of a spunbonded material of high-density polyethylene fibers, such as Tyvek® (commercially available from DowDupont) or other suitable protective, tear resistant materials for loading and storing items.

Figure 8:
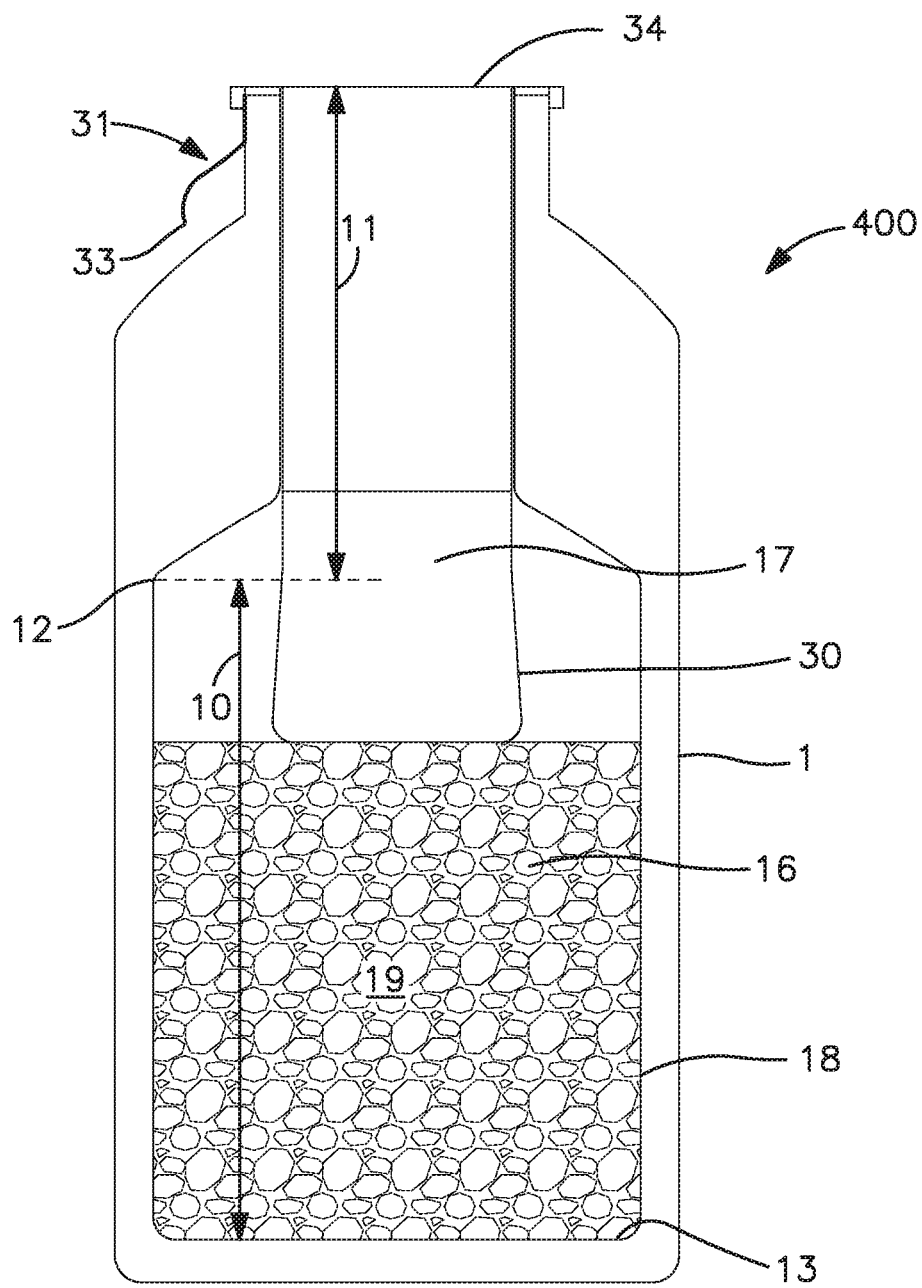
FIG. 8 illustrates a cross-sectional view of the flexible bag of FIGS. 7a and 7b connected to the tapered container of FIG. 7a, to form the apparatus with the dry ice chamber of the tapered container filled with dry ice.

The apparatus 400 filled with dry ice can be created as follows. With insulated cap 34 removed and flexible bag 30 removed from tapered container 1, a guiding assembly 41 with funnel 42 such as that shown in FIG. 4e is employed whereby extended ring 43 is placed along the interior neck section 11 of tapered container 1. Funnel 42 rests outwardly from the top of the tapered container 1 and provides an outwardly flared surface into which a user can readily feed dry ice 19. The interior volume 14 of tapered container 1 at this stage is partially or completely devoid of dry ice 19. The dry ice 19 can be fed into funnel 42. As dry ice 19 is fed into the funnel 42, the dry ice 19 falls through the bottom opening of funnel 42 and enters into the single restrictive access opening 15 of tapered container 1. Because no partitioning structure is within interior volume 14 of tapered container 1, the dry ice 19 can fill the entire floor 13 and continues to accumulate into the interior volume 14 as shown in FIG. 8. A portion of the interior body section 10 remains unfilled to allow sufficient clearance or empty space for flexible bag 30 to occupy the unfilled region within the interior body section 10 as shown in FIG. 8. The dry ice 19 is preferably filled to a height level that is below where the lowest portion of flexible bag 30 hangs or is suspended within the interior volume 14 of tapered container 1, such that the flexible bag 30 can be inserted into tapered container 1 and remain suspended within interior volume 14 of tapered container 1 along the interior body section 10 or interior neck section 11 without dry ice 19 interference. When dry ice 19 has been filled to a predetermined level which leaves sufficient empty space for flexible bag 30 to be suspended, the funnel 42 is removed from tapered container 1 through single restrictive access opening 15. Next, flexible bag 30 is inserted through single restrictive access opening 15 with or without loaded items. Items can be loaded into the interior of flexible bag 30 before or after inserting flexible bag 30 into tapered container 1. Tether 31 of flexible bag 30 is secured to tapered container 1 by tying free ends 33 of tether 31 to an exterior section of tapered container 1 (as shown in FIG. 8). In other embodiments, the free ends 33 may also be tied to an interior section of tapered container 1. An insulated cap 34 with cork (or other suitable cap structure) is inserted into the single restrictive access opening 15. The resultant apparatus 400 with dry ice 19 is shown in cross-sectional view in FIG. 8. Dry ice chamber 16 is located external to the flexible bag 30. Internal product storage volume 17 is located within the inner region of flexible bag 30. The apparatus 400 in its assembled state is ready to be used for storage, preservation, and/or transportation of the one or more items.

The flexible bag may be suspended by a variety of means. As an alternative to a tether 31, the flexible bag 30 may be suspended from a ring-like structure connected to and extending along the top edge of tapered container 1. The tether 31 can be replaced by a rigid ring that is connected to the top of the flexible bag 30 and prevents the flexible bag 30 from falling into the tapered container 1. The ring-like structure assists in maintaining the flexible bag 30 in a stable orientation during transport of tapered container 1.

Figure 9C:
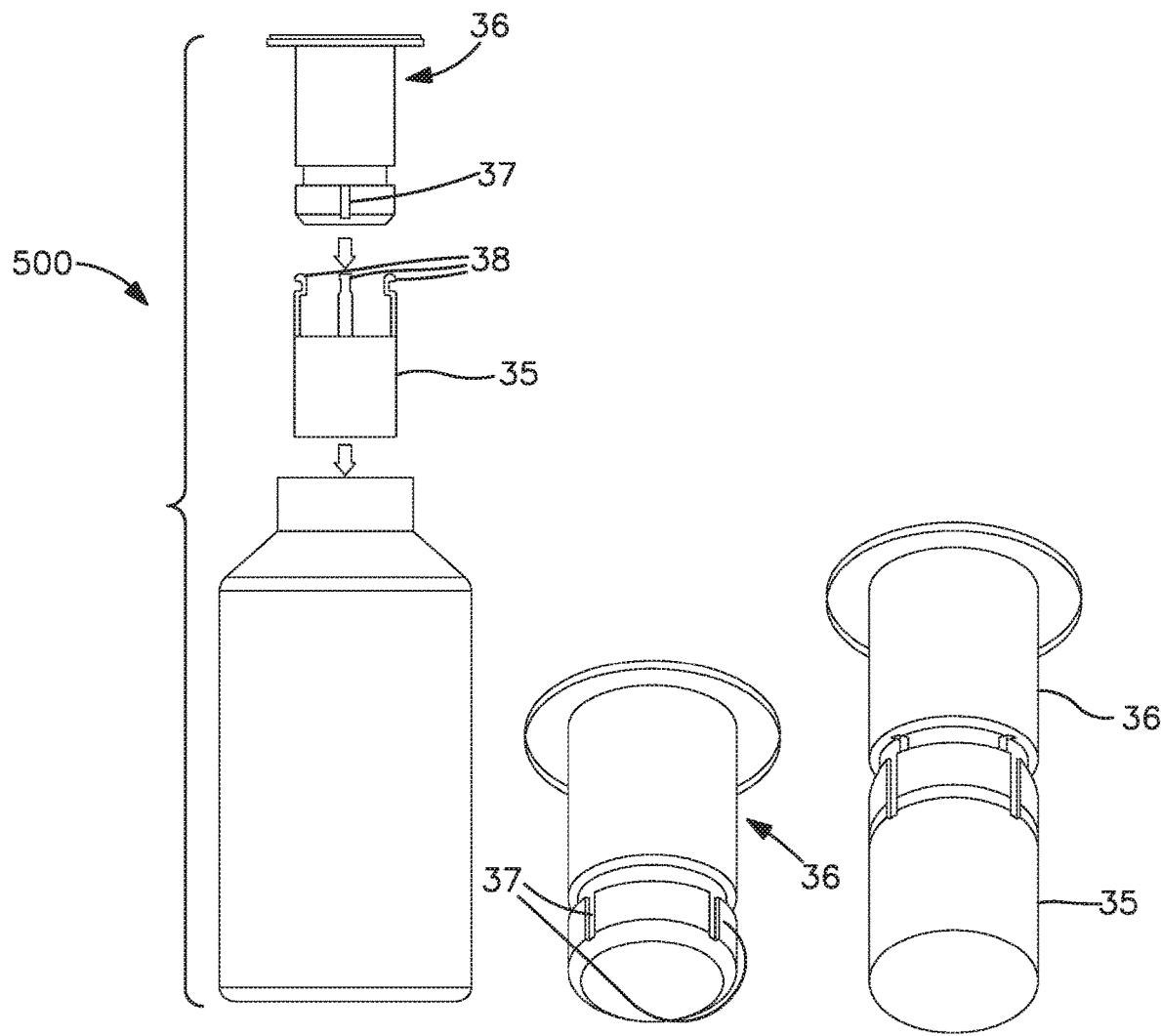
FIG. 9c illustrates a perspective view of the sample holder with arms configured to slide into grooves of the insulated cap of FIG. 9b.
Figure 9C:
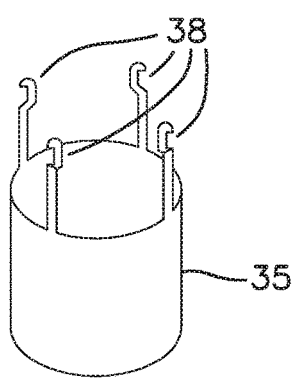
Figure 10:
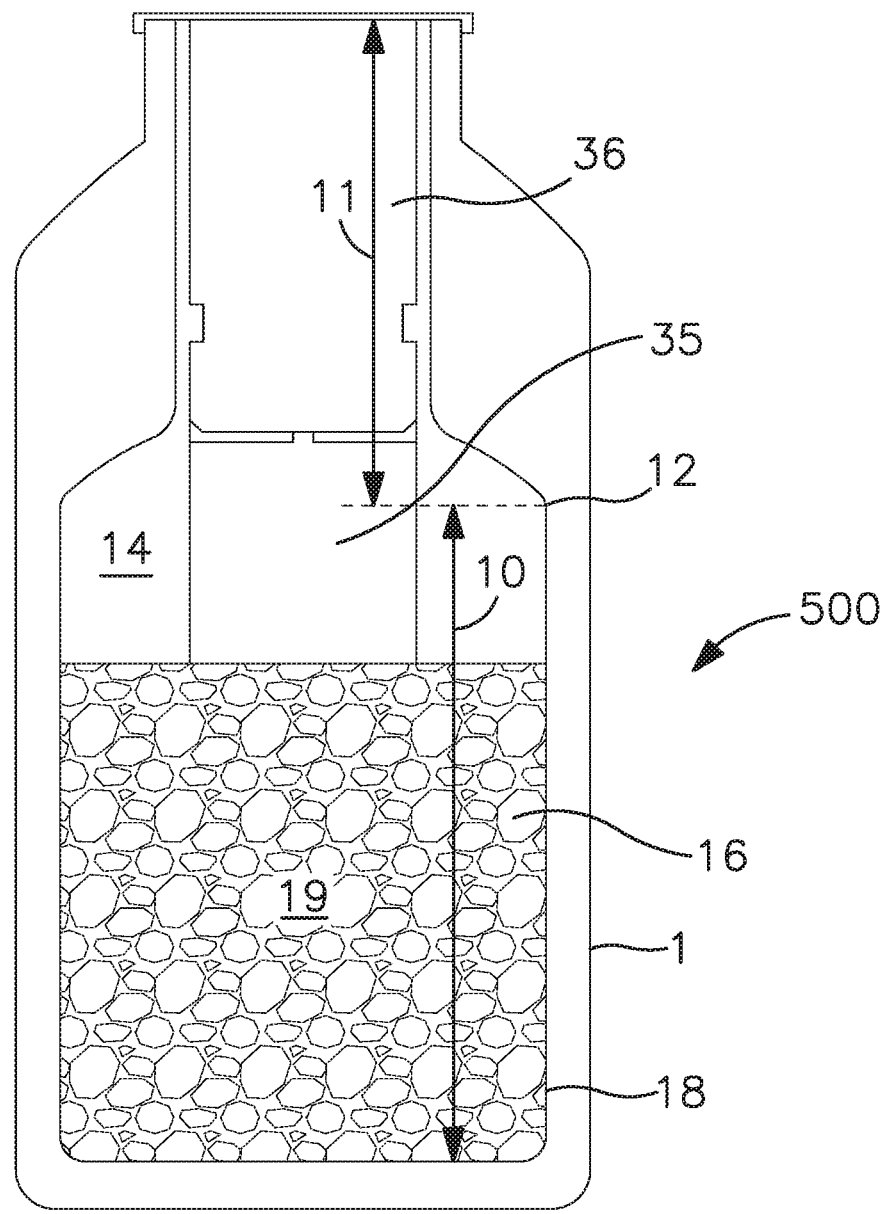
FIG. 10 illustrates a cross-sectional view of the insulated cap with grooves of FIGS. 9a and 9b having the sample holder with arms of FIGS. 9a and 9c connected thereto, such that the assembly of the cap and sample holder is positioned at the top of the tapered container of FIG. 9a to form an apparatus with the dry ice chamber of the tapered container filled with dry ice.

In another embodiment of the present invention, the one or more items may be stored in a specially designed cap having a built-in sample holder that connects into single restrictive access opening 15 to produce apparatus 500 of FIG. 10. Specifically, FIGS. 9a,-9d and 10 show an insulated cap 36 with grooves 37. Grooves 37 are sized to receive arms 38 of sample holder 35. FIGS. 9c and 9b show perspective views of the sample holder 35 with arms 38 and insulated cap 36 with grooves 37, respectively. Each of the arms 38 slides into a corresponding groove 37 to create a connected cap-sample holder assembly as shown in FIG. 9d.

Guiding assembly 41 with funnel 42 (FIG. 4e) is used to fill dry ice 19 into the interior volume 14 of tapered container 1, with the insulated cap 36 and sample holder 35 not yet connected to tapered container 1. Funnel 42 is placed along the top of tapered container 1 with the extended ring 43 extending into the single restrictive access opening 15 of the interior neck section 11 of tapered container 1. Funnel 42 extends outwardly from the top of the tapered container 1. The tapered container 1 at this stage is partially or completely devoid of dry ice 19. Dry ice 19 is fed into the funnel 42, which falls through the bottom opening of the funnel 42. Because no partitioning structure is within interior volume 14 of tapered container 1, the dry ice 19 can fill the entire floor 13 and continues to accumulate in the interior volume 14 as shown in FIG. 10. A portion of the interior body section 10 remains unfilled to allow empty space for insulated cap 36 and sample holder 35 connected thereto to hang and be suspended within the interior neck section 11 or the unfilled region of the interior body section 10 or within both the interior neck section 11 and the interior body section 10 of tapered container 1. The dry ice 19 is preferably filled to a height level that is below where the lowest portion of the insulated cap 36 with connected sample holder 35 hangs or is suspended within tapered container 1, such that the insulated cap 36 with connected sample holder 35 can be inserted into tapered container 1 and remain suspended within interior volume 14 of tapered container 1 along the interior body section 10 or interior neck section 11 without interference from dry ice 19. When dry ice 19 has been filled to a predetermined level which leaves sufficient empty space, funnel 42 is removed from tapered container 1 through single restrictive access opening 15. Next, with items loaded into sample holder 35, the arms 38 of sample holder 35 are mounted onto grooves 37 of insulated cap 36 to create the assembly of FIG. 9d. The assembly of cap 36 and sample holder 35 is then placed into the single restrictive opening 15 of tapered container 1 as shown in FIG. 10 to create apparatus 500. Dry ice chamber 16 is located external to the assembly of cap 36 and sample holder 35. Internal product storage volume 17 is located within the inner region of sample holder 35. Apparatus 500 in its assembled state is ready to be used for storage, preservation, and/or transport of the one or more items.

Other variations to the embodiments described herein are contemplated. For example, the cap 36 can have a built-in sample holder whereby the cap 36 has a door or other access means on its lower portion or other region that can be opened to receive one or more items. Additionally, an elongated sample holding device can be loaded within an inner region of the barrier-like structure 2. The elongated sample holding device is adapted to receive one or more items for the storing, preserving or transporting of the one or more items in the tapered container 1. The elongated sample holding device comprises a structural element suitable for grasping thereon to allow for removal of the elongated sample holding device from the interior region of the barrier-like structure 2, thereby potentially avoiding the need to remove the barrier-like structure 2. In one example, the elongated sample holding device may be a canister loaded within barrier-like structure 2 and configured to receive one or more items therein. The canister has a long handled hook that can be grasped onto for ease of loading and removing one or more items. The hook extends outwards from top edge of tapered container 1, thereby avoiding the need to access restrictive access opening 15 when loading and removing items from the canister. Alternatively, an elongated sample holding device may have retrieval loops extending from the top edge of tapered container 1 that can be grasped with a retrieval device, such as, by way of example, tongs as known in the art.

Additionally, with reference to FIGS. 1-6c, after removing cap of tapered container 1, a sleeve can be inserted into the interior neck section 11 of tapered container 1. The sleeve can be an outer cylinder that essentially fits over the barrier-like structure. Specifically, the sleeve has a geometry and an outer diameter that substantially conforms and mates with interior neck section 11, and an inner diameter that fits over the outer diameter of the barrier-like structure 2. By way of example and referring to FIG. 5, the sleeve (not shown) has a length that can extend from the top of interior neck section 11 to the floor 13 of tapered container 1, As such, the sleeve prevents dry ice 19 from exiting the dry ice region 16 through single restrictive access opening 15 when the tapered container 1 is inverted. By inverting the tapered container 1, the items within barrier-like structure 2 can slide out from tapered container 1, while dry ice 19 remains intact within dry ice region 16 as a result of sleeve blocking dry ice 19 from falling out. Alternatively, barrier-like structure 2 can be disengaged from tapered container 1 (whereby the disengagement occurs in a manner described hereinbefore) prior to inserting the sleeve described immediately above, thereby allowing a user to slide out the barrier-like structure 2 when tapered container 1 is inverted.

Any configuration of the barrier-like structures 2 within the tapered container 1 is contemplated. By way of example, the barrier-like structures 2 of the present invention need not be centrally oriented (as defined hereinabove) within the interior volume 14 of tapered container 1. More specifically, the top flat ring 24 and corresponding top opening of barrier-like structure 2 can be vertically non-aligned with the single restrictive access opening 15 along interior neck section 11.

In addition to the barrier-like structures 2 discussed hereinabove, the barrier-like structure 2 may comprise other suitable structures capable of remaining secured to the tapered container during storage and transport. For example, the barrier-like structure 2 can be formed from a relatively thin-walled flexible plastic material with spring-like brackets as has been described hereinbefore. Alternatively, the barrier-like structure 2 may comprise a relatively more rigid material such as stainless steel with notches along the bottom thereof that are designed to engage with corresponding brackets located on the floor 13 of tapered container 1. Other suitable barrier-like structures 2 capable of resisting excessive floating and shifting of items and dry ice 19 that can potentially damage the items and/or cause the items to become embedded in the dry ice 19 during storage and transport are contemplated by the present invention.

Other barrier-like structures are contemplated. For example, as alternatives to the flexible bag 30 and insulated cap 36 described hereinbefore, a so-called "barrier-like receptacle" having an access opening for accessing an interior region therewithin to receive one or more items can be utilized in accordance with the principles of the present invention. By way of example, the barrier-like receptacle can include the flexible bag 30 or insulated cap 36. The barrier-like receptacle can also include a plastic cup-like structure of sufficient rigidity or cardboard box-like structure. Generally speaking, the barrier-like receptacle can include any suitable structure that has an interior region for holding one or more items and which is sized to be introduced into the single restrictive access opening 15 of tapered container 1. In this manner, the barrier-like receptacle segregates the interior volume 14 of tapered container 1 into the internal product storage volume 17 and the dry ice chamber 16. A critical feature of the barrier-like receptacle is a retrieval member attached thereto. The retrieval member has an exposed retrieval member portion that extends out from or within the interior volume 14 of the tapered container 1 a sufficient amount for a user to grasp either manually or with a tool (e.g., barrier removal tool 50) to enable pulling the barrier-like receptacle out from interior volume 14 of the tapered container 1 as the means to access the one or more items that are contained within the barrier-like receptacle. Preferably, the barrier-like receptacle is suspended within tapered container 1 as described with the flexible bag 30. However, it should be understood that the barrier-like receptacle can also be in contact or embedded with the dry ice 19 located in dry chamber 16. The selection of a suitable type of barrier-like receptacle (e.g., flexible bag 30, insulated cap 36, rigid plastic cup-like structure, cardboard box-like structure) can depend on numerous factors, including the size of the single restrictive access opening 15, the volume capacity of the interior region 14 of tapered container 1 and the type, size and number of the one or more items to be preserved.

While the embodiments as described herein have been described and illustrated by way of a non-limiting and representative example as a single and continuous region for the dry ice chamber 16 and the internal product storage volume 17, it should be understood that the present invention contemplates a dry ice chamber 16 and/or internal product storage volume 17 that has been sectioned or sub-compartmentalized into one or more regions. For example, the internal product storage volume 17 inside of barrier-like structure 2 may have different items situated in different sub-compartmentalized sections within the internal product storage volume 17; and dry ice 19 may be filled into separate compartmentalized sections within the dry ice chamber 16 to create different cooling regimes as may be required for different types of items that are stored in different sub-compartmentalized sections of the internal product storage volume 17.

The methods and apparatuses of the present invention are applicable with the pre-charging $CO_2$ techniques within a tapered container, as disclosed in Serial application Ser. No. 16/223,233 and which is incorporated herein by reference in its entirety for all purposes. Additionally, the methods herein can also be used with the tapered containers and apparatuses described in Serial application Ser. No. 15/645,152, which is incorporated herein by reference in its entirety for all purposes. Still further, the methods and apparatuses of the present invention can be utilized with automated systems, including automated charging systems, as described in Serial application Ser. No. 16/221,906, which is incorporated herein by reference in its entirety for all purposes.

Numerous benefits are offered by the present invention. For example, the various apparatuses and tapered containers described herein have structural features that allow creation and maintenance of a product region separate and distinct from a dry ice region within the interior volume of the apparatuses and tapered containers. The integrity of the dry ice region and product region is maintained during transport of the tapered container. As a result, the present invention eliminates the co-mingling of dry ice and items during transport, storage and/or preservation, thereby allowing a user to readily access items stored in the apparatus without encountering difficulties associated with items buried or embedded within the dry ice. By avoiding co-mingling of dry ice with items, potential damage to items can be avoided. Sticking of items to dry ice are also eliminated as a result of dry ice not entering the product region and items not entering dry ice region. Additionally, the product region and dry ice region can be accessed to perform certain functions without obstruction from the other region. For example, dry ice can be filled into the dry ice region but not the product region.

Additionally, the structures of the apparatuses and tapered containers described herein allow items to be transported in a stable configuration such that the items within the product region do not have a tendency to float or shift to an extent where the items can be embedded within the dry ice, even when the conditions of transport and shipment may cause significant turbulence, vibration and impact to the tapered containers. The integrity of the product region and dry ice region is maintained and can survive under significant turbulence, vibration and impact to the tapered containers. Items remain accessible upon arriving at the destination site. Items remain fixedly secured in a structurally defined product region that is separate and distinct from a dry ice region, which allows insertion of items and removal of items without removal of dry ice.

The present invention also offers a solution for accessing a single restrictive access opening of the tapered container, which, prior to the emergence of the present invention, has been typically difficult to access, let alone perform certain functions of loading and removing items and filling dry ice into a dry ice region but not the product region. Selectively filling dry ice through a single restrictive access opening of a tapered container by a guiding assembly is possible such that the dry ice only enters the dry ice region, but not a product region. The loading or removal of items can occur in the presence of dry ice within the tapered container as a result of the unique apparatuses described herein. The ability to access and perform certain functions (e.g., load and remove items; fill dry ice into an empty tapered container; top off dry ice into a partially filled tapered container)

without disruption of either the dry ice region or product region allows the usage of tapered containers and relatively smaller sized tapered containers in comparison to commercially available boxes or tapered containers.

Additionally, the tapered containers of the present invention can impart required refrigeration to items loaded therein in which the items are capable of being preserved at or below a certain temperature for an extended duration in comparison to a commercially available transportable tapered container. Problems of rapid dry ice sublimation encountered with commercially available containers as a result of unacceptable levels of heat ingress are avoided by the present invention. In the present invention, there is an optimal arrangement of items and dry ice within the internal volume of the tapered container. The body section of the tapered container is preferably optimized with regards to the (i) arrangement of the dry ice and items and (ii) the volume capacity of the interior of the body section, so as to accommodate both the items and the dry ice in a manner that produces acceptable cooling duration of the particular items without a need for increasing the size and weight of the overall tapered container and without having to introduce an excessive amount of dry ice to create the required cooling duration of the particular items.

Another advantage of the present invention is the ability to remove some or all of the items from the sample region without pouring out dry ice 19 from the dry ice region 16 of tapered container 1. For example, insulated cap 34 of apparatus 400 has flexible bag 30 and insulated cap 36 of apparatus 500 has sample holder 35, such that removal of corresponding cap 34 or 36 allows items within accompanying flexible bag 30 or sample holder 35, respectively, to be removed without the need to discard dry ice 19 that is contained below in the interior body section 10. The same benefit has been illustrated and discussed with the structures described in the embodiments of FIGS. 1-6c.

On the contrary, commercially available boxes and containers require the dry ice to be poured out when items are removed from the box or the container, because the items are embedded within dry ice inside the box. Problems with discarding dry ice include potentially damaging items and causing the dry ice to spill in an uncontrolled manner on work premises, which poses safety hazards as previously described herein. Additionally, by emptying dry ice from the box and removing one or more items from the box, there may be no opportunity to re-use the box for continued storage of the one or more items, which might be desirable in cases where only a portion of the one or more items need to be extracted or where there is no other low temperature equipment where the one or more items can be stored frozen.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:

1. An apparatus with a single restrictive access opening for loading, positioning, removing, or accessing one or more items that can be stored, preserved or transported in a presence of dry ice, comprising:

a tapered container with an interior volume defined by an interior body section and an interior neck section, the interior body section comprising at least a first region, wherein the first region is a dry ice chamber, said dry ice chamber adapted to receive substantially all of the dry ice that is selectively directed as solid particles into the interior volume of the tapered container through the single restrictive access opening located at the interior neck section, said tapered container structurally configured to receive $CO_2$ solely in a solid phase;

the interior volume of the tapered container further including a second region that is non-overlapping with the first region of the tapered container, wherein the second region is an internal product storage volume contained within a barrier-like structure, the internal product storage volume characterized by a substantial absence of the dry ice, the internal product storage volume configured to be accessed through the single restrictive access opening to remove or load the one or more items;

the barrier-like structure having a first portion and a second portion with the internal product storage volume extending between the first portion and the second portion, said first portion of the barrier-like structure oriented within or towards the single restrictive access opening located at the interior neck section, said barrier-like structure having an opening into the internal product storage volume along the first portion, wherein said barrier-like structure partitions the interior volume of the tapered container into the first region and the second region, the barrier-like structure situated solely in the interior neck section, solely in the interior body section or within portions of the interior neck section and the interior body section.

2. The apparatus of claim 1, wherein the internal product storage volume is arranged to be separate and distinct from the dry ice chamber such that removal or loading of the one or more items within the barrier-like structure occurs without substantial disruption of the dry ice chamber, and further wherein the barrier-like structure is configured to prevent migration of the dry ice from the dry ice chamber into the interior product storage volume during storage, preservation or transport of the one or more items in the tapered container.

3. The apparatus of claim 1, wherein the dry ice chamber is characterized by an absence of foam-filled material or absorbent.

4. The apparatus of claim 1, wherein the barrier-like structure is characterized as a flexible bag.

5. The apparatus of claim 4, wherein the first portion of the flexible bag comprises a tether for reducing and enlarging a flexible access opening of the flexible bag, said tether comprising an exposed tether portion that extends out from the interior volume of the tapered container, said exposed tether portion configured to be grasped to access the flexible bag.

6. The apparatus of claim 1, wherein the second portion of the barrier-like structure extends towards a floor of the interior volume of the tapered container within the interior body section and further the barrier-like structure is permanently affixed to the tapered container.

7. The apparatus of claim 1, wherein the barrier-like structure is characterized as a barrier-like receptacle, said barrier-like receptacle having an access opening for accessing an interior region to receive the one or more items.

8. The apparatus of claim 1, wherein the barrier-like structure comprises a cap, said cap configured to engage with and disengage from the interior neck section of the tapered container.

9. The apparatus of claim 1, wherein the first portion or the second portion of the barrier-like structure is integrally or operably connected to the interior neck section or the interior body section of the tapered container.

10. The apparatus of claim 1, further comprising a predetermined amount of the dry ice occupying the dry ice chamber and surrounding the barrier-like structure, wherein the predetermined amount of the dry ice extends from a floor of the interior volume of the tapered container within the interior body section to a level in the dry ice chamber that is below the single restrictive access opening of the tapered container.

11. The apparatus of claim 4, said flexible bag having a flexible access opening for accessing an interior region of the flexible bag to receive the one or more items, a first portion of the flexible bag secured to the tapered container, and a second portion of the flexible bag extending at least partially through the single restrictive access opening of the interior neck section so as to remain in a suspended orientation within the interior neck section or the interior body section of the tapered container.

* * * * *